(12) United States Patent
Shirsat et al.

(10) Patent No.: US 11,532,950 B2
(45) Date of Patent: Dec. 20, 2022

(54) SYSTEMS AND METHODS FOR WIRELESS CHARGING AND WIRELESS DATA TRANSFER FOR MULTIPLE DEVICES

(71) Applicant: Western Digital Technologies, Inc., San Jose, CA (US)

(72) Inventors: Rohan Shirsat, Bangalore (IN); Shyam Chavali, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 884 days.

(21) Appl. No.: 16/406,612

(22) Filed: May 8, 2019

(65) Prior Publication Data

US 2020/0358316 A1    Nov. 12, 2020

(51) Int. Cl.
| | |
|---|---|
| *H02J 50/12* | (2016.01) |
| *H02J 50/80* | (2016.01) |
| *G06F 9/54* | (2006.01) |
| *H04W 4/80* | (2018.01) |
| *H02J 7/00* | (2006.01) |

(52) U.S. Cl.
CPC ............. *H02J 50/12* (2016.02); *G06F 9/542* (2013.01); *H02J 7/007192* (2020.01); *H02J 50/80* (2016.02); *H04W 4/80* (2018.02)

(58) Field of Classification Search
None
See application file for complete search history.

(56) References Cited

U.S. PATENT DOCUMENTS

| | | | | |
|---|---|---|---|---|
| 6,721,540 | B1* | 4/2004 | Hayakawa | G06K 19/0723 455/41.1 |
| 8,255,731 | B1* | 8/2012 | Alsina | G06F 11/1458 713/340 |
| 8,626,249 | B2 | 1/2014 | Ungari | |
| 8,805,456 | B1 | 8/2014 | Hardy | |
| 8,823,318 | B2 | 9/2014 | Liu | |
| 9,369,006 | B2 | 6/2016 | Kwon | |
| 9,438,065 | B2 | 9/2016 | Lee | |
| 9,461,501 | B2 | 10/2016 | Partovi | |
| 9,496,793 | B2 | 11/2016 | Bruwer | |
| 9,887,575 | B2 | 2/2018 | Park | |
| 9,973,239 | B2 | 5/2018 | Liu | |
| 9,985,481 | B2 | 5/2018 | Elad | |
| 10,170,908 | B1* | 1/2019 | Catalano | H02J 7/00 |
| 2002/0136380 | A1 | 9/2002 | Aoyama | |

(Continued)

FOREIGN PATENT DOCUMENTS

| | | |
|---|---|---|
| CN | 2884752 Y | 3/2007 |
| CN | 101147308 A | 3/2008 |

(Continued)

OTHER PUBLICATIONS

U.S. Appl. No. 16/274,626, filed Feb. 13, 2019, Shirsat.

(Continued)

*Primary Examiner* — Gennadiy Tsvey
(74) *Attorney, Agent, or Firm* — Crowell & Moring LLP

(57) ABSTRACT

Disclosed are devices and methods for performing wireless charging of an electronic device and establishing a wireless connection with a plurality of electronic devices for data transfer. Different modes of wireless data transfer can be used to ensure that the power supply of the electronic device is charged without interruption.

19 Claims, 8 Drawing Sheets

(56) References Cited

U.S. PATENT DOCUMENTS

| | | | |
|---|---|---|---|
| 2006/0223579 A1 | 10/2006 | Whitaker | |
| 2009/0191925 A1* | 7/2009 | Moseler | H04M 1/72409 455/573 |
| 2009/0243541 A1* | 10/2009 | Jeong | H02J 7/00045 320/108 |
| 2010/0156347 A1 | 6/2010 | Lee | |
| 2010/0194335 A1 | 8/2010 | Kirby | |
| 2011/0057607 A1 | 3/2011 | Carobolante | |
| 2012/0040613 A1* | 2/2012 | Nakano | H04B 5/0093 455/41.1 |
| 2012/0190412 A1 | 7/2012 | Buniatyan | |
| 2012/0306433 A1* | 12/2012 | Kim | B60L 53/36 307/104 |
| 2013/0110887 A1* | 5/2013 | Pan | G06F 1/26 713/300 |
| 2014/0159654 A1* | 6/2014 | Lee | H02J 50/12 320/108 |
| 2014/0245036 A1* | 8/2014 | Oishi | G06F 1/28 713/300 |
| 2014/0285004 A1* | 9/2014 | Ito | H02J 50/80 307/11 |
| 2014/0300200 A1* | 10/2014 | Ito | H04B 5/0037 307/104 |
| 2015/0115728 A1* | 4/2015 | Yamamoto | H02J 50/80 307/104 |
| 2015/0171930 A1 | 6/2015 | Joehren | |
| 2015/0380954 A1* | 12/2015 | Poulton | G01R 31/3835 320/162 |
| 2016/0099756 A1 | 4/2016 | Leabman | |
| 2016/0190856 A1* | 6/2016 | Baek | H02J 7/007 320/108 |
| 2016/0285299 A1 | 9/2016 | Amand | |
| 2016/0336804 A1* | 11/2016 | Son | H02J 50/12 |
| 2017/0331319 A1 | 11/2017 | Nitz | |
| 2017/0331329 A1 | 11/2017 | Kim | |
| 2018/0097379 A1* | 4/2018 | Taya | H02J 50/10 |
| 2018/0152058 A1* | 5/2018 | Lee | H02J 50/12 |
| 2018/0183254 A1* | 6/2018 | Park | H02J 7/0071 |
| 2018/0262024 A1* | 9/2018 | Raikar | H02J 7/007 |
| 2019/0013703 A1* | 1/2019 | Shichino | H02J 50/80 |
| 2019/0020214 A1 | 1/2019 | Ho | |
| 2019/0140470 A1* | 5/2019 | Wan | H02J 7/00309 |
| 2019/0363547 A1* | 11/2019 | Golan | H02J 7/00714 |
| 2020/0343777 A1* | 10/2020 | Jia | H02J 7/025 |

FOREIGN PATENT DOCUMENTS

| | | |
|---|---|---|
| CN | 201194243 Y | 2/2009 |
| CN | 105550061 A | 5/2016 |
| CN | 103647308 B | 3/2017 |
| CN | 103888548 B | 11/2017 |
| KR | 100697561 B1 | 3/2007 |
| KR | 2007044246 A | 4/2007 |
| KR | 2012107391 A | 10/2012 |
| KR | 2014082628 A | 7/2014 |
| KR | 101703437 B1 | 2/2017 |
| KR | 101933167 B1 | 12/2018 |
| WO | WO2005114809 A3 | 12/2005 |
| WO | WO2018184536 A1 | 10/2018 |

OTHER PUBLICATIONS

IXpand Base User Guide (2016), http://downloads.sandisk.com/downtoads/um/ixpand-base-um.pdf?_ga=2.160242173.1994749197.1550043930-351129424.1550043930.

Canvio for Smartphone, https://www.toshiba-storage.com/products/toshiba-smartphone-storage-canvio-for-smartphone/ (downloaded May 6, 2019).

User's Manual Canvio for Smartphone (2016), https://www.toshiba-storage.com/wp-content/uploads/2018/01/UM_Canvio_for_Smartphone.pdf.

Meem Memory Back Up Your Phone Every Time You Charge, https//www.meemmemory.com/(downloaded May 6, 2019).

Wireless system transmits both power and data simultaneously (Sep. 19, 2017), https://newatlas.com/wireless-power-data-system/51393/.

RAVPower Portable Wireless Charger, https://www.youtube.com/watch?v=CK22T5uUCJA (downloaded May 6, 2019).

BoostUp Special Edition Wireless Charging Pad, https://www.belkin.com/us/p/P-F7U054/ (downloaded May 6, 2019).

Perera, et al, A Survey on Simultaneous Wireless Information and Power Transfer, 2017 J. Phys.: Conf. Ser. 803 012113 (2017).

International Search Report for International Application No. PCT/US2019/068988 dated Apr. 2, 2020.

Written Opinion for International Application No. PCT/US2019/068988 dated Apr. 2, 2020.

\* cited by examiner

SYSTEMS AND METHODS FOR WIRELESS CHARGING AND WIRELESS DATA TRANSFER FOR MULTIPLE DEVICES

TECHNICAL FIELD

Certain embodiments disclosed herein relate to systems and methods for wireless charging and wired data transfer, including concurrent wireless charging and wireless data transfer.

BACKGROUND

Portable electronic devices, such as smartphones, tablets, smartwatches, have become ubiquitous. Such devices can include a rechargeable battery and memory for storing data. There exists a need for systems and methods that can recharge the battery and back-up data from a portable electronic device seamlessly and efficiently. Existing charging and data transfer devices suffer from one or more disadvantages. For example, charging can be interrupted by data transfer and vice versa. Systems and method disclosed herein advantageously solve the shortcomings of existing devices.

BRIEF DESCRIPTION OF THE DRAWINGS

The innovations described in the claims each have several aspects, no single one of which is solely responsible for its desirable attributes. Without limiting the scope of the claims, some prominent features of this disclosure will now be briefly described.

Systems and methods that embody the various features of the disclosure will now be described with reference to the following drawings, in which.

DETAILED DESCRIPTION

Figure 1A:
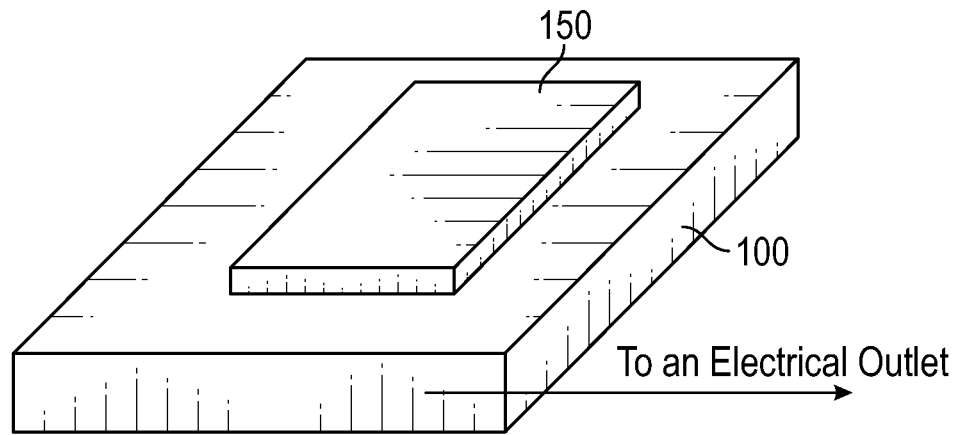
FIG. 1A illustrates a schematic view of a device for wireless charging and wireless data transfer according to some embodiments.

While certain embodiments are described, these embodiments are presented by way of example only, and are not intended to limit the scope of protection. Indeed, the novel methods and systems described herein may be embodied in a variety of other forms. Furthermore, various omissions, substitutions, and changes in the form of the methods and systems described herein may be made without departing from the scope of protection.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount.

Overview

Mobile electronic devices such as smart phones, tablets, smart pads, handheld computing devices, etc. have changed the way people communicate, work, and consume entertainment. Everyday users of mobile electronic devices generate a considerable amount of data, such as, for example, photographs, documents, videos, etc. The amount of available electronic storage in a mobile electronic device may be limited. Accordingly, an average mobile electronic device user transfers the generated data to a storage system, such as, for example, a personal storage device or a cloud storage a few times a month (e.g., every day or a few times a week). For example, an average mobile electronic device user may transfer or back-up about 20 files/day and/or about 500 files/per month having an average size of about 5 megabytes (Mbytes) from the mobile electronic device to their personal storage device or a cloud storage.

Wireless charging of the mobile electronic devices has become increasingly widespread and popular over the past few years. Wireless charging allows users to charge various electronic devices without having those devices tethered to a wall plug or other charging devices. By eliminating the need for cords to charge electronic devices, wireless charging technology has made charging electronic devices simpler and more convenient.

Innovative aspects contemplated by this application include a wireless charging and data transfer device that can wirelessly charge a mobile electronic device and wirelessly transfer from the mobile electronic device to a personal storage device or a cloud storage. The transfer of data from the mobile device to the wireless charging and data transfer device can occur using a Wi-Fi network, in some implementations.

The wireless charging and data transfer device can comprise a surface over or onto which the mobile electronic device can be placed for wireless charging. For example, the wireless charging and data transfer device can be configured as a pad. The wireless charging and data transfer device can include internal storage device including but not limited to NAND Flash, Secure Digital (SD)/Micro Secure Digital (OD) card/Hard Disk Drive (HDD)/Solid State Drive (SSD) to store the data wirelessly transferred from the mobile electronic device. In some implementations, the internal storage device of the wireless charging and data transfer device can be configured to temporarily store the data wirelessly transferred from the mobile electronic device and transfer the data stored in the internal storage device to a personal storage device or a cloud storage. In various implementations, the personal storage device can comprise a hard disk drive, a solid state drive, a flash drive or combinations thereof. Such device can have a storage capacity greater than a few hundreds of gigabytes (e.g., a few terabytes).

Wireless Charging and Data Transfer System

The wireless charging and data transfer system or device can be configured to be connected to an external power source (e.g., via a power adapter) to generate power to wirelessly charge the mobile electronic device placed there-upon. Inductive charging systems and methods can be used to wirelessly charge the mobile electronic device in some implementations. For example, the wireless charging and data transfer device can comprise a wireless power transmitter including an inductive coil that generates wireless power that is received by an inductive coil of a wireless power receiver of the mobile electronic device. The power received wirelessly from the wireless charging and data transfer device is used to charge the battery of the mobile electronic device.

FIG. 1A illustrates an electronic device 150 disposed on or over a surface of a wireless charging and data transfer device 100 according to some implementations. The electronic device 150 may be a mobile electronic device such as a smartphone, a tablet, a smartwatch, a laptop, a videogame console, and the like. The wireless charging and data transfer device 100 is configured as a pad in the illustrated implementation. The wireless charging and data transfer device 100 can be connected to an electrical outlet (e.g., a 110 volt (V) wall outlet, a 240 V wall outlet, etc.). Wireless charging may be initiated when the electronic device 150 is placed on the surface of the wireless charging and data transfer device 100 or brought within a predetermined distance from the device 100, as described herein.

Figure 1B:
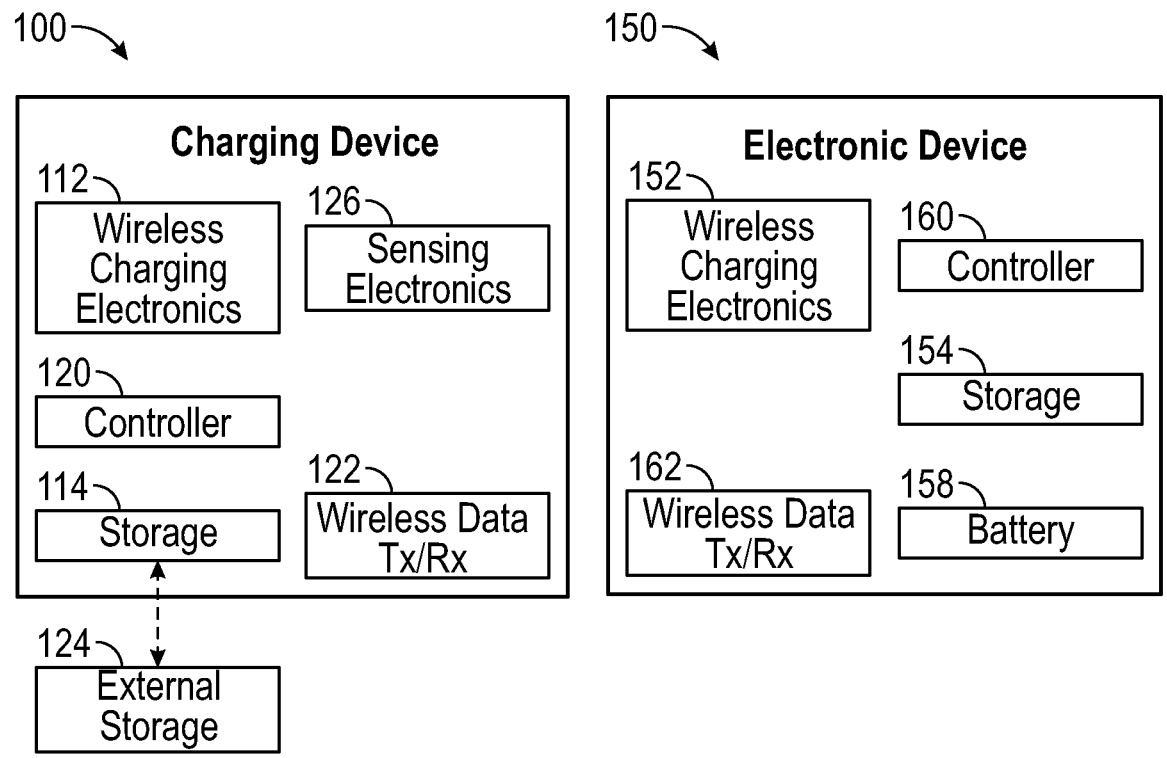
FIG. 1B illustrates a schematic diagram of a device, such as the device of FIG. 1A, and an electronic device according to some embodiments.

FIG. 1B illustrates a schematic diagram of a wireless charging and data transfer device 100 and an electronic device 150, according to some implementations. The device 100 can include a wireless charging circuitry or electronics 112 configured to provide power wirelessly to the electronic device 150, sensing circuitry or electronics 126 configured to sense a temperature of a surface of the device 100, a storage 114, a wireless data transmitter and/or receiver circuitry or electronics 122 (sometimes referred to as a wireless data transmitter/receiver circuitry or electronics), and a controller 120. The various electrical components of the device 100 can be enclosed in a housing. In some implementations, the housing can be configured as a pad having an external surface on or over which the electronic device 150 can be disposed. The electronic device 150 can include a wireless charging electronics 152 configured to receive power wirelessly, a storage 154, a wireless data transmitter/receiver electronics 162, and a power source 158, such as a battery. The electronic device 150 can include a controller 160, which can implement one or more features of the controller 120 as described herein. The device 100 can include a power source or be connected to an external power source, such as, for example an electrical outlet. Any of storages 114 or 154 can include one or more of volatile or non-volatile memory, such as magnetic memory, solid state memory, or the like. Any of the storages 114 or 154 can be removable, such as a secure digital (SD) card.

The controller 120 can be operatively coupled to the various electrical components of the device 100, such as, for example, the wireless charging electronics 112, the storage 114, the wireless data transmitter/receiver electronics 122 and the sensing electronics 126 such that it can control the various electrical components. Accordingly, the controller 120 may provide and/or receive signals to and/or from the various electrical components of the device 100 to control operation of the device 100. For example, the controller 120 can be configured to detect presence of the electronic device 150 based on one or more signals received from the wireless charging electronics 112 and/or the wireless data transmitter/receiver electronics 122. For example, presence detection can be accomplished by detecting that the electronic device is proximal to the surface of the device 100. Such detection can be accomplished, for instance, by detecting a change in a magnetic field produced by the wireless charging electronics 112 to charge the electronic device 150.

In response to detecting presence of the electronic device 150, the controller 120 may be further configured to obtain information regarding the charge or amount of energy stored in the power source 158 of the electronic device 150 and initiate wireless charging of the electronic device 150 if the power source 158 of the electronic device 150 is below a threshold level. In response to detecting presence of the electronic device 150, the controller 120 may be further configured to initiate and manage wireless transfer of data from the electronic device 150 to the storage 114. For example, the wireless data transmitter/receiver electronics 122 can wirelessly receive data from the wireless data transmitter/receiver electronics 162 of the electronic device 150. The controller 120 can receive the data from the wireless data transmitter/receiver electronics 122 and transmit the data to the storage 114 for storing. The controller 120 can direct the wireless data transmitter/receiver electronics 122 to store data received from the electronic device 150 to the storage 114.

The controller 120 may be further configured to initiate and manage transfer of data from the storage 114 to an external storage 124, such as, for example, a personal storage device or a cloud storage device. The data from the storage 114 to the external storage 124 can be transferred over a wired or a wireless connection. For example, the controller 120 can access or receive data stored in the storage 114 and transmit the data to the external storage 124. As another example, the controller 120 can access or receive data stored in the storage 114 and direct the wireless data transmitter/receiver electronics 122 to transmit the data to the electronic device 150. In various implementations, the controller 120 can be configured to receive information from the sensing electronics 126 regarding the temperature of a surface of the device 100 and in response to determining that the temperature of the surface of the device 100 is above a threshold, stop transmission/reception of data from the electronic device 150 and/or to the external storage 124.

The wireless charging electronics 112 of the device 100 and the wireless charging electronics 152 of the electronic device 150 can cooperate to effectuate wireless charging of the electronic device 150. The wireless charging electronics 152 of the electronic device 150 may be a receiver while the wireless charging electronics 112 of the device 100 may be a transmitter. The wireless charging electronics 152 and wireless charging electronics 112 can each include a coil that can receive and/or transfer, respectively, power by electromagnetic induction. The wireless charging electronics 152 can provide power to charge the power source 158. As discussed herein, the operation of the wireless charging electronics 112 of the device 100 may be controlled by the controller 120.

The wireless charging electronics 112 of the device 100 and the wireless charging electronics 152 of the electronic device 150 can be driven to generate the power required to charge the power supply 158 of the electronic device 150. For example, the wireless power transmitted by wireless charging electronics 112 of the device 100 and received by the wireless charging electronics 152 of the electronic device 150 can be between about 5 watts (W) and about 20 W. For example, in various implementations, the wireless power transmitted by wireless charging electronics 112 of the device 100 and received by the wireless charging electronics 152 of the electronic device 150 can be greater than or equal to about 7.5 W and less than or equal to about 15 W. As another example, in various implementations the wireless power transmitted by wireless charging electronics 112 of the device 100 and received by the wireless charging electronics 152 of the electronic device 150 can be greater than or equal to about 10 W and less than or equal to about 15 W.

Figure 2:
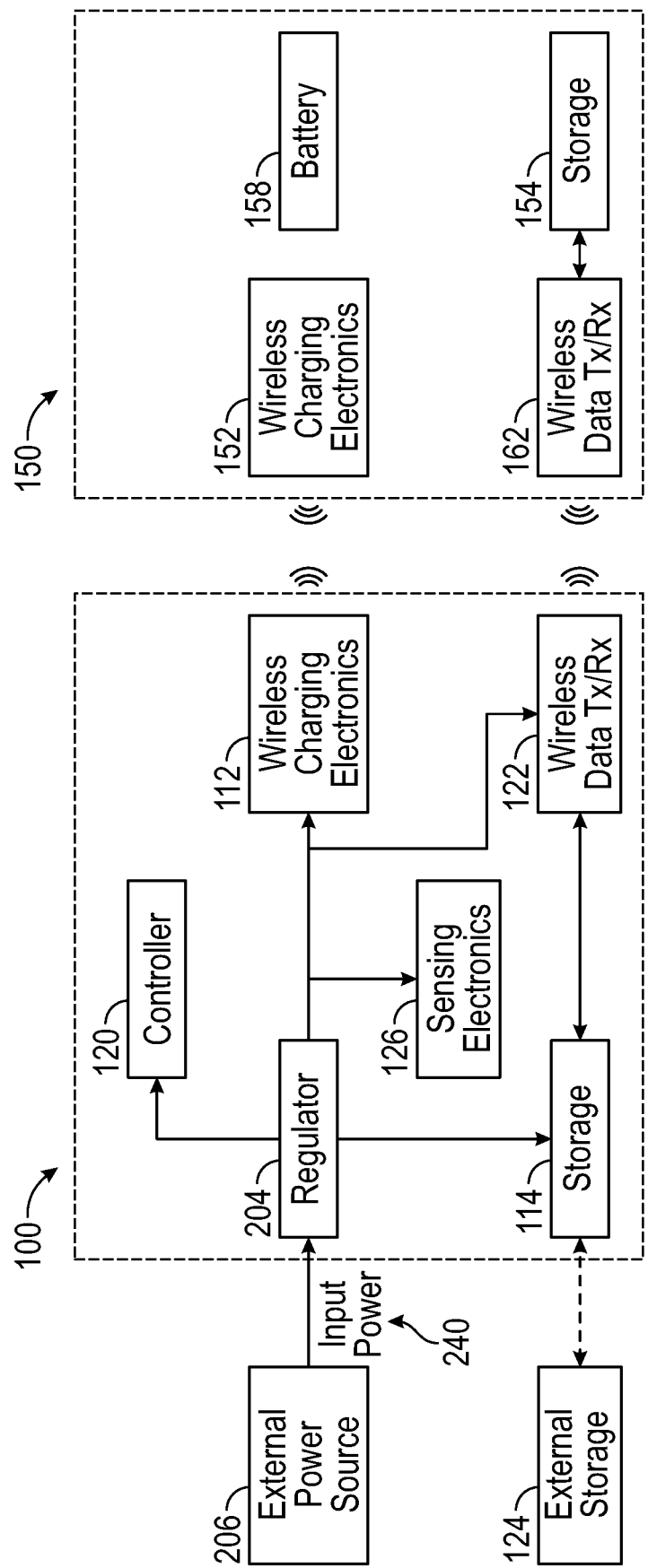
FIG. 2 illustrates yet another a schematic diagram of a device, such as the device of FIG. 1A wirelessly connected to an electronic device, according to some embodiments.

In some implementations, the device 100 can further include a regulator 204 as shown in FIG. 2, which illustrates another schematic diagram of a wireless charging and data transfer device, such as the device 100, wirelessly connected to an electronic device 150 according to some implementations. As shown in FIG. 2, the device 100 can be operatively connected to an external power source 206 such that the regulator 204 can receive input power 240 from the external power source 206. In some implementations, the power source 206 can be internal to the device 100. However, in some other implementations, the power source 206 can be external to the device 100. The regulator 204 can process the input power 240 and generate output power for supplying to various electrical elements of the device 100 including the wireless charging electronics 112, the wireless data transmitter/receiver electronics 122, the controller 120, the storage 114, and the like. The regulator 204 can be configured as one or more of a voltage regulator, current regulator, or the like. For example, the regulator 204 can be a stepdown regulator.

The output power supplied by the regulator 204 can vary for different electronic elements or modules of the device 100. For example, output power can have a voltage between about 5 volts (V) and about 20V for the wireless charging electronics 112 and/or the wireless data transmitter/receiver electronics 122. The electronic device 150 can also comprise a regulator (not shown) that is configured to receive and process electrical power from the power source 158 and provide an output power to the various modules or components of the electronic device 150 including but not limited to the wireless charging electronics 152, the wireless data transmitter/receiver electronics 162 and the storage 154.

As discussed herein, it may be desirable to simultaneously charge the power supply 158 of the electronic device 150 and transfer data from the electronic device 150 to a storage device. However, simultaneous charging of the power supply 158 of the electronic device 150 and transfer data from the electronic device 150 to a storage device can increase the time required to fully charge the power supply 158 in some cases. For example, in various implementations of the electronic device 150, the power supply 158 of the electronic device 150 can be fully charged (e.g., 100% charged) in about 4-6 hours using an existing wired or a wireless charging device without data transfer from the electronic device 150 to a storage device. However, when combined with data transfer from the electronic device 150 to a storage device, the time required to fully charge the power supply 158 can increase. The increase in the time required to fully charge the power supply when charging and data transfer is combined can be attributed to an increase the temperature of the power supply, which is explained in greater detail herein. For example, it may take 10-16 hours to fully charge the power supply 158 of the electronic device 150 using an existing wired or a wireless charging device when combined with data transfer from the electronic device 150 to a storage device. This increase in the charging time when the function of data transfer is combined with charging of the power supply is undesirable.

As discussed herein, the process of charging the power supply of the electronic device and the process of transferring data from the electronic device can generate a significant amount of heat which in turn can heat the power supply of the electronic device. The sources of heat can include the various electronic circuitry that is configured to transmit and receive data from the phone including but not limited to the system on chip (SOC) for Wi-Fi, Bluetooth, USB, SD controller and memory, Wi-Fi and Bluetooth antennae, and/or DC-DC regulators. The sources of heat can further include the electronic circuitry configured to charge the power supply of the electronic device. Without relying on any particular theory, the heat generated during the process of charging the power supply of the electronic device and the process of transferring data from the electronic device can increase the temperature of the power supply (e.g., battery). In various implementations of the electronic device, the charging voltage and/or charging current provided to charge the power supply can be reduced as the temperature of the power supply increases to prevent damage to the power supply, increase life of the power supply and/or to maintain reliable operation of the power supply.

For example, in various implementations of the electronic device, the maximum charging power (e.g. charging current and/or charging voltage) may be provided when the temperature of the power supply is in a range between about 10 degrees Celsius (° C.) and 30° C. The charging power can be reduced as the temperature of the power supply increases above 30° C. Without relying on any particular theory, the charging power provided to the power supply can be reduced by half from the maximum charging power as the temperature of the power supply increase above 35° C. In some implementations of the electronic device 150, the charging power may be reduced to zero or close to zero as the temperature of the power supply increases above 43° C. In some implementations of the electronic device 150, charging of the power supply may be stopped if the temperature of the power supply is in a range between about 43° C. and about 60° C.

In accordance with the above discussion, the temperature of the power supply may increase more quickly when charging of the power supply and data transfer processes are combined as compared to when charging the power supply alone. Thus, the amount of time that the maximum charging power is supplied to the power supply when charging of the power supply and data transfer processes are combined can be less than the amount of time that the maximum charging power is supplied to the power supply when charging the power supply alone. The reduction in the amount of time that the maximum charging power is supplied to the power supply when charging of the power supply and data transfer processes are combined can explain the increase in the time required to fully charge the power supply when combined with transferring of data from the electronic device.

Various implementations of the wireless charging and data transfer device 100 described herein include simultaneous wireless charging of the power supply 158 of the electronic device 150 and wireless transfer of data from the electronic device 150 to the storage 114 and/or the external storage 124 when the electronic device 150 is brought in a wireless charging range of the wireless charging and data transfer device 100 in a time that is comparable to the time it takes for existing devices to charge the power supply 158 alone without transfer of data. For example, various implementations of the wireless charging and data transfer device 100 described herein are configured to simultaneously transfer data from the electronic device 150 to the storage 114 and/or the external storage 124 and fully charge the power supply 158 of the electronic device 150 in about 4-6 hours. Furthermore, the simultaneous wireless charging of the power supply 158 of the electronic device 150 and wireless transfer of data from the electronic device 150 to the storage 114 and/or the external storage 124 can be initiated automatically when the electronic device 150 is brought in the wireless charging range of the wireless charging and data transfer device 100. The wireless charging and data transfer device 100 can advantageously provide the same charging experience of the electronic device 150 that a user is accustomed to with the added benefit of backing-up content of the electronic device 150 to a storage device. Various implementations of the wireless charging and data transfer device 100 can be configured to transfer data received from the electronic device 150 from the storage 114 to the external storage 124 when (i) the power supply of the electronic device 150 is fully charged and the contents of the electronic device 150 are backed-up; and/or (ii) the electronic device 150 is no longer wirelessly connected with the wireless charging and data transfer device 100. Systems and methods that allow the wireless charging and data transfer device 100 to wirelessly charge the power supply of the electronic device and wirelessly transfer data from the electronic to a storage device in a time that is comparable to the time it takes for existing devices to charge the power supply 158 alone without transferring data are described in detail herein.

As discussed herein, various implementations of the wireless charging and data transfer device 100 can be powered through an external power source 204 (e.g., an electrical wall outlet). In some implementations, the wireless charging and data transfer device 100 can be configured such that it is always in the 'ON' state when connected to the external power source 204 such that the wireless charging electronic 112 and/or the wireless data transmitter/receiver electronics 122 is always 'ON'. However, in some implementations, the wireless charging and data transfer device 100 can be provided with a switch to turn on/off the wireless charging electronics 112 and/or the wireless data transmitter/receiver electronics 122, which can be performed by the controller 120.

Wireless Charging and Data Transfer

Wireless charging and data transfer, which may be simultaneous, can be initiated or triggered when the electronic device 150 is interfaced with the wireless charging and data transfer device 100 so that the electronic device 150 is in the wireless charging range of the device 100. The electronic device 150 can be interfaced with the device 100 by placing the electronic device 100 on or over the surface of the device 100 or by bringing the electronic device 150 in the vicinity of the device 100. In various implementations, the electronic device 150 can be interfaced with the device 100 by bringing the electronic device 150 within a distance less than about 20 centimeters from the device 100. For example, the electronic device 150 can be interfaced with the device 100 by bringing the electronic device 150 within a distance less than or equal to about 15 centimeters from the device 100, a distance less than or equal to about 10 centimeters from the device 100, a distance less than or equal to about 5 centimeters from the device 100, a distance less than or equal to about 2 centimeters from the device 100, less than or equal to about 1.5 centimeters from the device 100, by placing the electronic device 150 on a surface of the device 100, or the like.

In various implementations, the device 100 can be configured to detect that the electronic device 150 is interfaced with the device 100. For example, in various implementations, when the electronic device 150 is interfaced with the device 100, one or more components of wireless charging electronics 112 (e.g., the transmitter or the transmitting coil) can detect the presence of one or more components of the wireless charging electronics 152 (e.g., the receiver or the receiving coil). In some implementations, the presence of the wireless charging electronics 152 of the electronic device 150 in the vicinity of the wireless charging electronics 112 can generate one or more of a change in the magnetic field, an electrical current, or an electrical voltage, which may be used to detect that the electronic device 150 is interfaced with the device 100. Such detection can be performed by the controller 120.

Various implementations of the device 100 can additionally comprise an electronic signaling circuit (e.g., an integrated Bluetooth chipset) that is configured to intermittently or periodically emit an electronic signal (e.g., a Bluetooth low energy (BLE) beacon). In some implementations, the electronic signaling circuit can be a part of the wireless data transmitter/receiver electronics 122. The electronic signal from the electronic signaling circuitry can be used to detect that the electronic device 150 is interfaced with the device 100 in addition to or instead of using the wireless charging electronics 112 to detect that the electronic device 150 is interfaced with the device 100. In response to detecting that the electronic device 150 is interfaced with the device 100, the wireless charging or simultaneous wireless charging and data transfer processes may be initiated and/or continued.

In various implementations, in response to detecting that the electronic device 150 is interfaced with the device 100, the device 100 (for example, the controller 120) can be configured to obtain one or more characteristics of the electronic device 150. The characteristics can include one or more of name of the manufacturer of the electronic device 150, model of the electronic device 150, the range of charging currents and voltages that can be supplied to charge the power supply 158 of the electronic device 150 at different temperatures, the temperature above which charging of the power supply 158 of the electronic device 150 is disabled. The range of charging currents and voltages that can be supplied to charge the power supply 158 at different temperatures and the temperature above which charging of the power supply 158 of the electronic device 150 is disabled can be obtained for different makes and models of the electronic device 150 and stored in an electronic memory. Depending on the make and model of the electronic device 150, the corresponding range of charging currents and voltages that can be supplied to charge the power supply 158 at different temperatures and the temperature above which charging of the power supply 158 of the electronic device 150 is disabled can be used to ensure that the appropriate charging power is supplied to the power supply 158 depending on its temperature.

The device 100 (for example, the controller 120) can also be configured to obtain information about a current state of the electronic device 150 to help in making decisions regarding wireless charging and wireless data transfer operations to allow for simultaneous charging and data transfer in a reasonable amount of time. The current state can include information regarding connectivity of the electronic device 150 with the device 100. For example, the device 100 can be configured to determine if the electronic device 150 is interfaced with the device 100 (or is in the wireless charging range of the device 100). The device 100 can be configured to determine whether the electronic device 150 is brought in the vicinity of the device 100 or is placed on a surface of the device 100. As yet another example, the device 100 can be configured to determine whether the electronic device 150 removed from the surface of the device 100 or removed from the vicinity of the device 100. The current state of the electronic device 150 can also include the charging state of the power supply 158, such as the amount or percentage of charge remaining in the power supply 158, which can provide an indication of the amount of time that the power supply 158 can provide power to the different components of the electronic device 150 to sustain operation of the electronic device 150. The current state of the electronic device 150 can further include a temperature of the power supply 158.

The current state of the electronic device 150 can further include the number and/or size of files that may need to be transferred from the electronic device 150 for back-up. In some implementations, the current state of the electronic device 150 can additionally include the type of files (e.g., photos, videos, contacts, emails, messages, etc.) may need to be transferred from the electronic device 150 for back-up. For example, the device 100 can be configured to access a log of files that have been backed-up. The contents of the electronic device 150 can be compared with the log of files that have been backed-up to identify the files in the electronic device 150 that may need to be transferred from the electronic device 150 for back-up. In some implementations, the device 100 can be further configured to obtain a count of the number of files that may need to be transferred from the electronic device 150 for back-up.

In some implementations, the device 100 can be configured to sort the files that are identified for back-up based on the size and/or type. For example, in some implementations, the device 100 can be configured to sort the files that are identified for back-up based on their size. For example, the files that may need to be transferred from the electronic device 150 can be sorted into two groups—a first group in which the files that may need to be transferred from the electronic device 150 have a size less than a threshold size and a second group in which the files that may need to be transferred from the electronic device 150 have a size greater than the threshold size. The threshold size can be in a range between about 1 megabytes (MB) and 5 MB, such as, for example, 2 MB or 3 MB.

In some implementations, the device 100 can be configured to sort the files that are identified for back-up based on their type (e.g., photographs, videos, documents, emails, messages, etc.). For example, the files that may need to be transferred from the electronic device 150 can be sorted into two groups—a first group comprising photographs; and a second group comprising videos.

As discussed herein, the device 100 can be configured to, using one or more components of the wireless charging electronics 112 alone or in combination with the controller 120, to detect the presence of one or more components of the wireless charging electronics 152 as the electronic device 150 is placed on or over a surface of the device 100 or brought in the vicinity of the device 100. In response to detecting the presence of one or more components of the wireless charging electronics 152 in the vicinity of the device 100, the device 100 (for example, the controller 120) may be configured to automatically initiate wireless charging of the power supply 158 under certain conditions. For example, if the power supply 158 is determined to be not fully charged, then in response to detecting that the electronic device 150 is interfaced with the device 100, the device 100 can be configured to automatically deliver charging power wirelessly to the electronic device 150. The initiation of the wireless charging of the power supply 158 can be recorded as a charging event which can trigger automatic transfer of data from the electronic device 150 under certain conditions.

As discussed herein, the charging power can be transmitted by the transmitter portion of the wireless charging electronics 112 and received by the receiver portion of the wireless charging electronic 152 to charge the power supply 158. As discussed herein, the device 100 (for example, the controller 120) can be configured to determine the charging state of the power supply 158. The amount of wireless power supplied by the wireless charging electronics 112 can depend, for example, on the percentage of charge remaining on the power supply 158. For example, if the power supply 158 is fully charged or close to being fully charged (e.g., between about 80%-100% of the maximum charge), then the wireless charging electronics 112 may deliver an amount less than the maximum charging power. When the power supply 158 is fully charged or close to being fully charged (e.g., between about 80%-100% of the maximum charge), the amount of charging power supplied by the wireless charging electronics 112 of the device 100 can be sufficient to fully charge the power supply 158 or maintain the power supply 158 in the fully charged condition. In some implementations, once the power supply 158 if the electronic device 150 is fully charged, an internal battery management system the electronic device 150 can be configured to provide a trickle charge current or voltage (e.g., a charge current less than 100 milliamps) to maintain the power supply 158 in the fully charged condition. In some such implementations, the device 100 can be configured to resume supplying charging power if the charge of the power supply 158 falls below 95% of the maximum charge.

In some implementations, if the power supply 158 has a charge that is less than about 80% of the maximum charge, the device 100 (for example, via the wireless charging electronics 112 and/or controller 120) may be configured to deliver the maximum possible charging power so that the power supply 158 is fully charged as fast as possible (e.g., in a time period less than or equal to 6 hours). As discussed herein, the device 100 can be configured to intermittently obtain the temperature of the power supply 158 of the electronic device 150. The wireless charging electronics 112 may be controlled to change the amount of charging power supplied to the electronic device 150 based on the temperature of the power supply 158.

The automatic transfer of data from the electronic device 150 to the storage 114 may be triggered by the start of the wireless charging of the power supply 158 in some implementations. In some implementations, the automatic transfer of data from the electronic device 150 to the storage 114 may be triggered by the detection of the electronic device 150 by the electronic signaling circuit that is configured to intermittently emit an electrical signal, as described herein, to detect the presence of the electronic device 150. In some implementations, the automatic transfer of data from the electronic device 150 to the storage 114 may be triggered by the start of the wireless charging of the power supply 158 and the detection of the electronic device 150 by the electronic signaling circuit that is configured to intermittently emit the electrical signal to detect the presence of the electronic device 150. The electronic device 100 (for example, the controller 120) can be configured to automatically adjust the mode of wireless data transfer based on a variety of factors including but not limited to the percentage of charge remaining on the power supply 158 and the temperature of the power supply 158.

Different modes of wirelessly transferring data from the electronic device 150 to the storage 114 are discussed herein. As discussed herein, wireless transfer of data from the electronic device 150 to a storage device can comprise identifying files for back-up; accessing the files for back-up from the storage 154 of the electronic device 150 and transmitting the accessed files by the transmitter portion of the wireless data transmitter/receiver electronics 162; receiving the transmitted filed by the receiver portion of the wireless data transmitter/receiver electronics 122; temporarily storing the received filed in the storage 114; and transmitting the temporarily stored files to the external storage 124. Without any loss of generality, data can be wirelessly transferred from the electronic device 150 to the device 100 at a rate of about 1 MB/s and about 10 MB/s. For example, in various implementations, data can be wirelessly transferred from the electronic device 150 to the device 100 at a rate of about 5 MB/s. The wireless transfer of data from the electronic device 150 to the device 100 can be based on an electronic communication protocol.

Different Modes of Wireless Data Transfer

A. First Mode—when the Charging State of the Power Supply is Low

Various implementations of the electronic device 150 can be configured to enter a low power mode in which the electronic device 150 operates with reduced functionality when the amount of charge of the power supply 158 is at or below a low charge threshold, such as, for example, less than or equal to about 20%, less than or equal to about 10%, less than or equal to about 10%, less than or equal to about 5%, less than or equal to about 3%, less than or equal to about 1%, or the like. Accordingly, if the amount of charge of the power supply 158 is low, the wireless data transfer can be suspended (for example, by turning off the wireless data transmitter/receiver electronics 122 of the device 100 and/or the wireless data transmitter/receiver electronics 162 of the electronic device 150) so as to conserve the charge of the power supply and allow the electronic device 150 to operate with reduced functionality. If the amount of charge of the power supply 158 is low, then the wireless transfer of data from the electronic device 150 to the storage 114 can be suspended or stopped in various implementations. A notification can be provided to the user that back-up of the contents of the electronic device 150 has not started and/or has been stopped.

B. Second Mode—when the Charging State of the Power Supply is Medium

Data from the electronic device 150 to the storage 114 can be wirelessly intermittently transferred if the amount of charge of the power supply 158 is medium. The amount of charge of the power supply 158 can be considered to be medium if the amount of charge is above the low charge threshold and at or below a medium charge threshold. The medium charge threshold can be less than or equal to about 80%, less than or equal to about 75%, less than or equal to about 70%, less than or equal to about 65%, less than or equal to about 60%, or the like of the maximum charge. In some cases, the amount of charge can be considered to be medium if the amount of charge is above the low charge threshold and below a high charge threshold (as described herein). When the amount of charge of the power supply 158 is medium, charging of the power supply has more priority than transfer of data for back-up, since the user would prefer that the power supply 158 is sufficiently charged in a reasonable amount of time. Accordingly, when the amount of charge of the power supply 158 is medium, it is desirable if the wireless charging electronics 122 is configured to provide the maximum amount of charging power possible to the electronic device 150 based on the temperature of the power supply 158 to quickly charge the power supply 158 to the maximum possible charge in a time period less than about 6 hours (e.g., 1-4 hours). Transferring the data from the electronic device 150 to the storage 114 for a limited period of time or transferring limited amount of data (sometimes referred to as intermittently transferring) can reduce or prevent the risk of the temperature of the electronic device 150 and the power supply 158 to increase above a threshold temperature thereby allowing the maximum possible amount of charging power to be delivered to the electronic device 150 to allow the power supply 158 to be quickly charged to the maximum possible charge in a time period less than about 6 hours (e.g., 1-4 hours). Various methods of intermittently transferring data from the electronic device 150 to the storage 114 are possible, two of which are discussed herein.

B.1 Finite Data Count Method

One method of intermittently transferring data from the electronic device 150 to the storage 114 can comprise suspending wireless data transfer after a finite amount of data is transferred from the electronic device 150 to the storage 114. For example, in some implementations, the wireless data can be suspended after approximately a number (N) of files having an average size of about K megabytes (MB) that are identified for back-up have been transferred from the electronic device 150 to the storage 114. A notification can be provided to the user that NxK amount of megabytes have been backed-up from the electronic device 150 and back-up has been temporarily stopped. The notification can further include information regarding the approximate time/charging state when back-up will recommence.

The number (N) of files that are transferred before suspending the wireless data transfer can be between about 100 and 200 files in some implementations. The average size K of the files that are transferred can be less than or equal 5 megabytes (MB) (e.g., less than or equal to about 3 MB), in some implementations. This method can be referred to as finite data count method (FDCM). The wireless transfer of data from the electronic device 150 to the storage 114 can be resumed (e.g., by turning on the wireless data transmitter/receiver electronics 162 and/or the wireless data transmitter/receiver electronics 122) after a certain amount of time has elapsed or after the power supply has been charged by a certain amount. In this manner, a certain amount of data is intermittently transferred from the electronic device 150 to the storage 114 for back-up simultaneously with charging the power supply without interrupting the charging process or lengthening the charging period. Finite amount of data can include between about 300 megabytes and about 1000 megabytes B.2 Finite Time Method Another method of intermittently transferring data from the electronic device 150 to the storage 114 can comprise suspending the wireless data transfer after data has been transferred for a finite amount of time. For example, in some implementations, the wireless data transfer can be suspended after transferring files that are identified for back-up for approximately P minutes. The amount of time, 'P' during which data is transferred, can be between 1-5 minutes (e.g., 2 minutes, 3 minutes, etc.). For example, consider an implementation in which the wireless data transfer is suspended after files identified for back-up have been transferred from the electronic device 150 to the storage 114 for about 2 minutes. If the average size of a file is about 3 MB and the data rate is about 5 MB/s, then the wireless data transfer is suspended after 200 files having an average size of about 3 MB have been transferred. This method can be referred to as finite time method (FTM). A notification can be provided to the user that 'X' amount of megabytes have been backed-up from the electronic device 150 and back-up has been temporarily stopped. The notification can further include information regarding the approximate time/charging state when back-up will recommence. The 'X' amount of megabytes can refer to the amount of data backed-up in the P amount of time. The wireless transfer of data from the electronic device 150 to the storage 114 can be turned on (e.g., by turning on the wireless data transmitter/receiver electronics 162 and/or the wireless data transmitter/receiver electronics 122) after a certain amount of time has elapsed or after the power supply has been charged by a certain amount. In this manner, data is intermittently transferred from the electronic device 150 to the storage 114 for back-up for a certain duration of time simultaneously with charging the power supply without interrupting the charging process or lengthening the charging period.

C. Third Mode—when the Charging State of the Power Supply is High

As discussed herein, wireless transfer of data from the electronic device 150 to the storage 114 can be stopped after a certain amount of data has been transferred or after data has been transferred for a certain amount of time. The supply of charging power from the wireless charging electronics 112 to the electronic device 150 continues in the time that data is being transferred and after wireless transfer of data is stopped. As the charge of the power supply 158 increases wireless transfer of data may be intermittently turned on and turned off again. Once, the charge of the power supply 158 is above a high charge threshold, the wireless transfer of data from the electronic device 150 to the storage 114 can be turned on (e.g., by turning on the wireless data transmitter/receiver electronics 162 and/or the wireless data transmitter/receiver electronics 122). The high charge threshold can be greater than or equal to about 90%, greater than or equal to about 91%, greater than or equal to about 92%, greater than or equal to about 93%, greater than or equal to about 94%, greater than or equal to about 95%, greater than or equal to about 96%, greater than or equal to about 97%, greater than or equal to about 98%, greater than or equal to about 99%, greater than or equal to about 100% of the maximum charge of the power supply 158, or any value in a range/sub-range defined by any of these values. In some implementations, data can be wirelessly transferred from the electronic device 150 to the storage 114 without restrictions or interruptions (such as, continuously) when the charge of the power supply 158 is between about 100% of the maximum charge and the high charge threshold. As discussed herein, the amount of charging power supplied by the wireless charging electronics 112 when the charge of the power supply 158 is between about 100% of the maximum charge and the high charge threshold can be lower than the maximum charging power that can be supplied by the wireless charging electronics 112. The process of transferring data from the electronic device 150 to the storage 114 can cause the charge of the power supply 158 to decrease faster than the rate at which the power supply 158 is charged. Accordingly, in some such implementations, if the charge of the power supply 158 falls below the high charge threshold, the device 100 and/or the electronic device 150 can be configured to intermittently turn off the wireless transfer of data from the electronic device 150 to the storage 114 as discussed herein with reference to the second mode of wireless data transfer.

In this manner, data is wirelessly transferred from the electronic device 150 to the storage 114 by switching between the second mode of wireless data transfer and the third mode of wireless data transfer until all the files that are identified for back-up are transferred from the electronic device 150 to the storage 114. In various implementations, the wireless data transfer can be suspended once all the files that are identified for back-up are transferred from the electronic device 150 to the storage 114 to keep the temperature of the power supply 158 below a threshold temperature.

The different modes of wirelessly transferring data from the electronic device 150 to the storage 114 discussed herein can allow for simultaneous charging of the electronic device 150 and back-up of the contents of the electronic device 150 in a time comparable to only charging the electronic device 150. Furthermore, the different modes of wirelessly transferring data from the electronic device 150 to the storage 114 can advantageously allow the contents of the electronic device 150 to be backed-up while maintaining the charge of the power supply 158 at 100% of the maximum charge or close to 100% of the maximum charge. Moreover, the different modes of wirelessly transferring data from the electronic device 150 to the storage 114 also can advantageously maintain the temperature of the power supply 158 below a threshold temperature thereby reducing or preventing risk of damage to the power supply 158 from high temperatures.

As discussed herein, various implementations of the device 100 can be configured to sort the files that are identified for back-up based on their size and/or type. In some such implementations, the device 100 can back-up the files that have a smaller size (e.g., size less than or equal to about 5 MB) during the second mode of wireless data transfer and back-up files having a larger size (e.g., size greater than about 5 MB) when the charge of the power supply is high during the third mode of wireless data transfer. For example, in some implementations video files having a size greater than about 20 GB (e.g., 40 GB, 50 GB, 60 GB, etc.) can be wirelessly transferred from the electronic device 150 to the storage 114 when the charge of the power supply is high during the third mode of wireless data transfer. The wireless transfer of video files and/or files having a larger size (e.g., size greater than about 5 MB) can be stopped (e.g., by turning off the wireless data transmitter/receiver electronics 162 and/or the wireless data transmitter/receiver electronics 122) if the charge of the power supply 158 falls below the high charge threshold and resumed (e.g., by turning off the wireless data transmitter/receiver electronics 162 and/or the wireless data transmitter/receiver electronics 122) once the power supply 158 is charged to an amount greater than or equal to about 90% of the maximum charge.

The device 100 can be configured to monitor (e.g., continuously or intermittently) the temperature of the power supply 158 while wirelessly transferring data from the electronic device 150 to the storage 114 in the different modes discussed herein. The device 100 can be configured to stop wireless transfer of data (e.g., by turning off the wireless data transmitter/receiver electronics 162 and/or the wireless data transmitter/receiver electronics 122) from the electronic device 150 to the storage 114 if the temperature of the power supply 158 is at or near a threshold temperature which may necessitate a reduction in the amount of charging power delivered to the electronic device 150 and/or otherwise cause an increase in the charging time of the power supply 158. A notification can be provided to the user that the back-up of the contents of the electronic device 150 has been stopped and will resume once the temperature of the power supply of the electronic device 150 is below a threshold. The device 100 can be configured to resume wireless transfer of data (e.g., by turning on the wireless data transmitter/receiver electronics 162 and/or the wireless data transmitter/receiver electronics 122) from the electronic device 150 to the storage 114 once the temperature of the power supply 158 is below the threshold temperature. In this manner, the device 100 is configured to help maintain an optimal temperature of the power supply 158 to allow for fast charging. These functions can be performed under control of the controller 120.

Various implementations of the device 100 can be configured such that wireless charging is disabled once the distance between the electronic device 150 and the device 100 is greater than a threshold distance. For example, in some implementations, wireless charging of the power supply 158 may be disabled if the electronic device 150 is taken out of wireless charging range of the device 100. For example, the device 150 can be removed from the surface of the device 100, placed at a distance greater than about 5-10 cm (or another distance described herein) from the surface of the device 100, or the like.

In some such implementations, the electronic device 150 may be within the range of detection of the electronic signaling circuit of the device 100 and/or in the range where wireless transfer of data from the electronic device 150 to the storage 114 is possible. In such implementations, once the wireless charging is disabled (due to, for example, the electronic device 150 being out of the wireless charging range of the device 100), back-up of data from the electronic device 150 to the storage 114 can be prioritized. Accordingly, data from the electronic device 150 to the storage 114 can be wirelessly transferred without any constraints or restrictions. In some such implementations, the device 100 can be configured to wirelessly back-up files regardless of their size and type when the wireless charging of the power supply 158 is disabled. Once, the electronic device 150 is positioned on the surface of the device 100 or brought within a threshold distance for wireless charging, the electronic device 100 can be configured to simultaneously wirelessly charge the power supply 158 and wirelessly transfer data from the electronic device 150 to the storage 114 using the different modes of wireless data transfer discussed herein.

Data Transfer from the Wireless Charging and Data Transfer Device to an External Storage As discussed herein, the device 100 can be configured to transfer the data from the electronic device 150 which is stored in the storage 114 to the external storage 124. As discussed herein, the external storage 124 can be a personal storage device or a cloud storage. In some implementations, the transfer of data from the storage 114 to the external storage 124 can occur simultaneously with the wireless charging of the power supply 158. In some implementations, the transfer of data from the storage 114 to the external storage 124 can occur once all the files that are identified for back-up are transferred from the electronic device 150 to the storage 114. In some implementations, the transfer of data from the storage 114 to the external storage 124 can occur simultaneously along with transfer of the files that are identified for back-up from the electronic device 150 to the storage 114.

The process of transferring data from the storage 114 to the external storage 124 can cause an increase in the temperature of one or more components of the device 100 which in turn may cause the temperature of the surface of the device 100 on which the electronic device 150 is placed to increase. The increase in the temperature of the surface of the device 100 on which the electronic device 150 can in turn cause the temperature of the power supply 158 to increase resulting in a slow-down of the charging process. Accordingly, the device 100 can comprise one or more thermal sensors to monitor a temperature of the surface of the device 100 on which the electronic device 150 is placed and stop the transfer of data from the storage 114 to the external storage 124 if the temperature of the surface of the device 100 on which the electronic device 150 is placed is above a threshold temperature. The one or more thermal sensors may be operationally coupled with the sensing electronics 126 of the device 100.

Method of Wirelessly Charging and Transferring Data

Figure 3A:
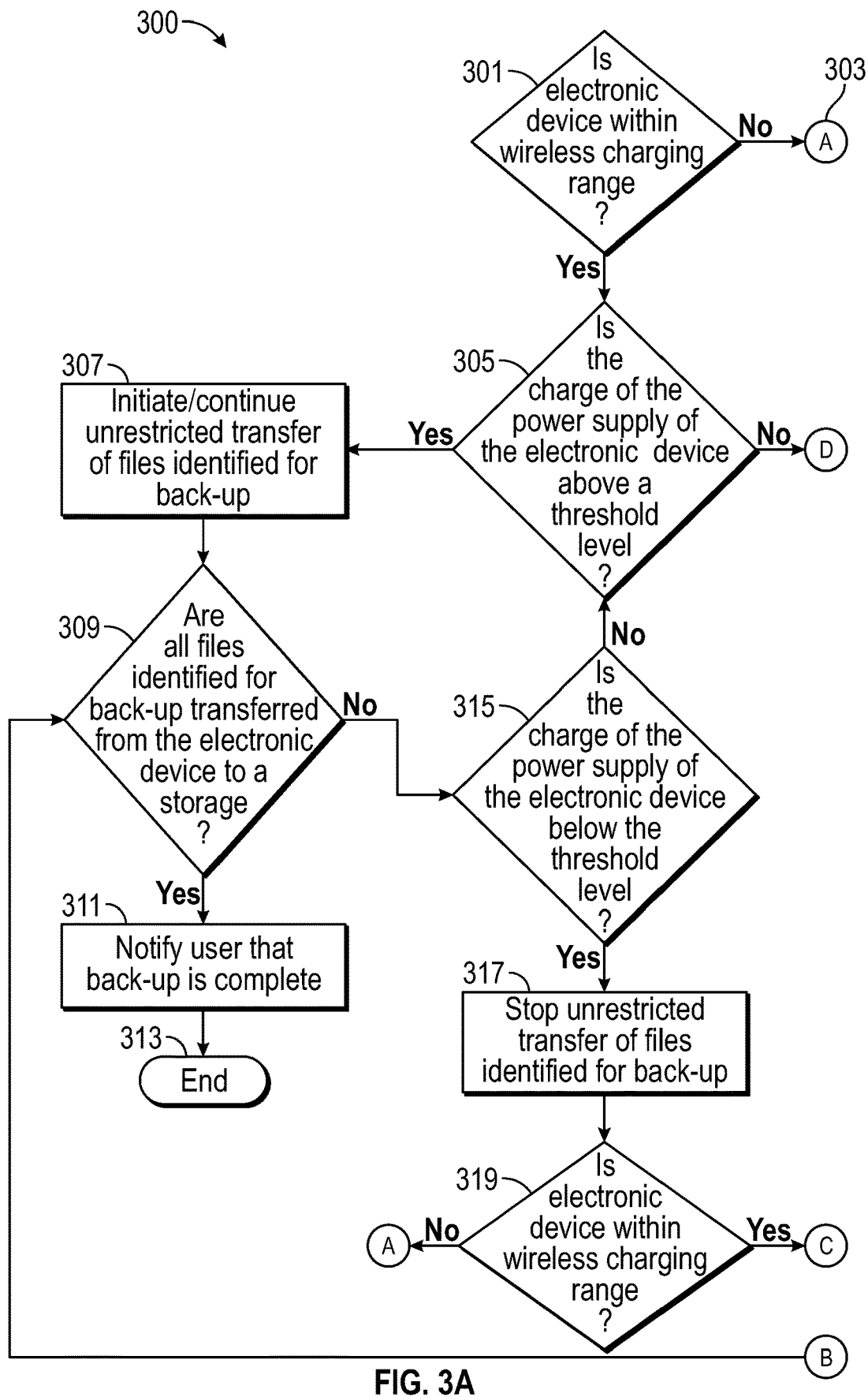
FIGS. 3A, 3B and 3C are flowcharts illustrating example methods of wirelessly charging and transferring data from an electronic device.
Figure 3A:
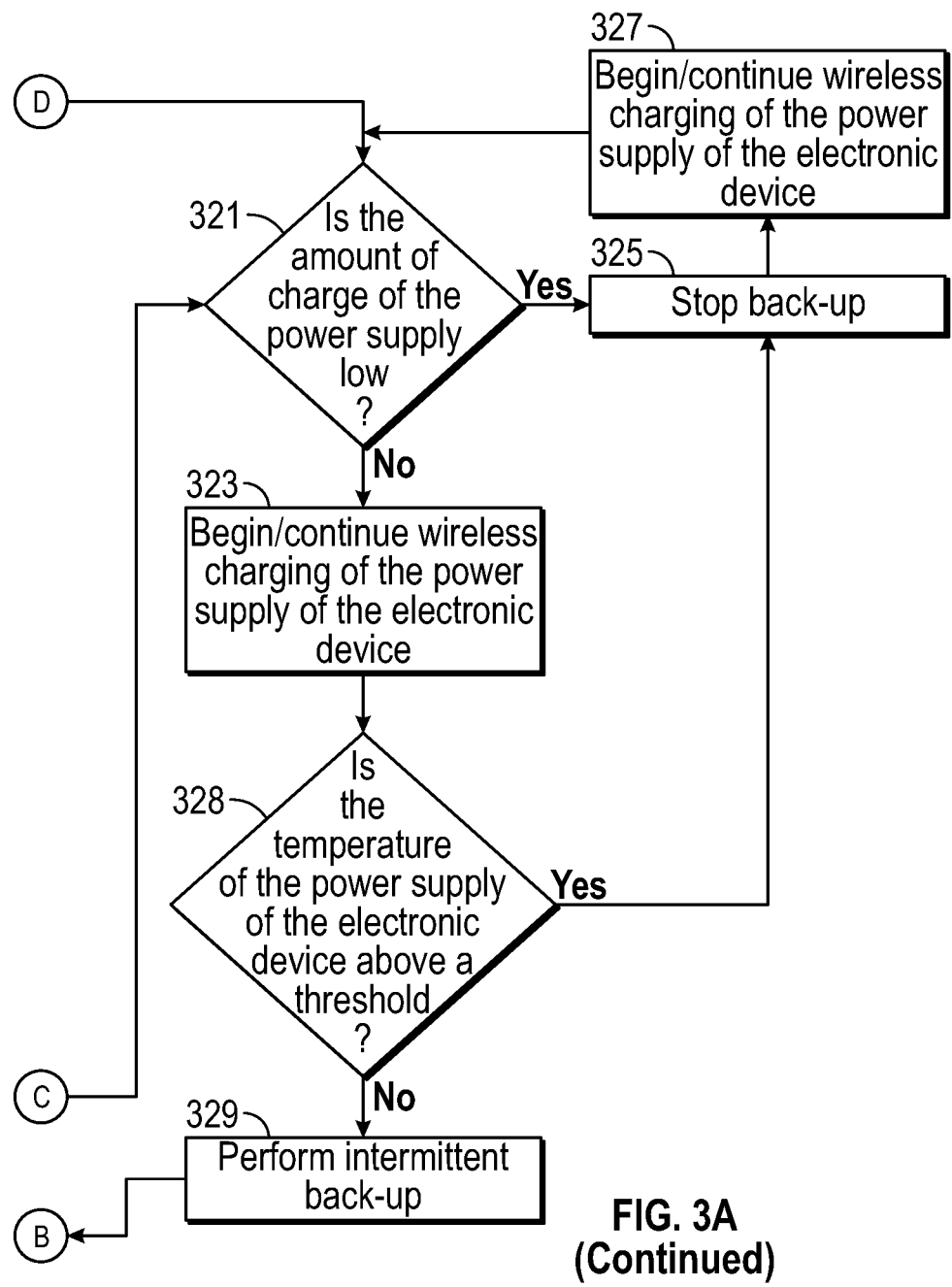

FIG. 3A is a flow chart illustrating an example implementation of a method 300 to wirelessly charge and back-up an electronic device (e.g., the electronic device 150) using a wireless charging and data transfer device (e.g., the device 100). The method can comprises determining if the electronic device is within a wireless charging range of the wireless charging and data transfer device as shown in block 301. For example, in various implementations, the electronic device can be considered to be within the wireless charging range of the wireless charging and data transfer device if the electronic device is placed on a surface of the wireless charging and data transfer device and/or is within threshold distance of the wireless charging and data transfer device, as described herein. If the electronic device is within a wireless charging range of the wireless charging and data transfer device, then the method can comprise determining if the charge of the power supply of the electronic device satisfies a threshold level, as shown in block 305. The threshold level can be the high charge threshold as described herein. If in block 305, the charge of the power supply of the electronic device is above a threshold level, then the method can comprise initiating/continuing unrestricted transfer of files identified for back-up as shown in block 307. Unrestricted transfer of files identified for back-up can include transferring files identified for back-up without any restrictions on the number of files transferred, the size of an individual file to be transferred, the type of the file to be transferred and/or the amount of time over which file transfer takes place. If in block 309 it is determined that all the files identified for back-up have been transferred from the electronic device to the storage of the wireless charging and data transfer device, then a notification is provided to the user that back-up is complete, as shown in block 311 and the process ends as shown in block 313.

If, however, in block 309, it is determined that all the files identified for back-up have not been transferred from the electronic device to the storage of the wireless charging and data transfer device, then the process can proceed to block 315 where a determination is made whether the charge of the power supply of the electronic device is below the threshold level. As discussed herein, the threshold level can be the high charge threshold, in some implementations. If in block 315, it is determined that the charge of the power supply of the electronic device is below the threshold level, then unrestricted transfer of files identified for back-up is stopped, as shown in block 317. The method can then proceed to block 319, where it is determined whether the electronic device is within the wireless charging range of the wireless charging and data transfer device. If, either in block 319 or in block 301, it is determined that the electronic device is not within the wireless charging range of the wireless charging and data transfer device, then the method proceeds to block 303 which is illustrated in FIG. 3B.

If, either in block 305 or in block 315 it is determined that the charge of the power supply of the electronic device is below the threshold (such as, the high charge threshold) and it is further determined that the electronic device is within the wireless charging range of the wireless charging and data transfer device, then the method can proceed to block 321. In block 321 a determination regarding the amount of charge of the power supply is made. If, in block 321, it is determined that the amount of charge of the power supply is low (e.g., does not satisfy the low charge threshold), then the transfer of files identified for back-up from the electronic device to the storage of the wireless charging and data transfer device can be stopped, as shown in block 325. The wireless charging of the power supply of the electronic device can be initiated or continued as shown in block 327. If, in block 321, it is determined that the amount of charge of the power supply is not low (e.g., satisfies the low charge threshold), then wireless charging of the power supply of the electronic device is initiated or continued as shown in block 323 and the transfer of files identified for back-up is performed intermittently, as shown in block 329. Intermittent back-up can include stopping the wireless transfer of files, once a certain number of files have been transferred (e.g., FDCM) or after data has been transferred wirelessly for a certain amount of time (e.g., FTM). Some implementations of the method 300 can further comprise determining the temperature of the power supply of the electronic device, as shown in block 328 and stopping wireless transfer of the files identified for back-up from the electronic device to the storage if the temperature of the power supply is above the threshold.

Figure 3B:
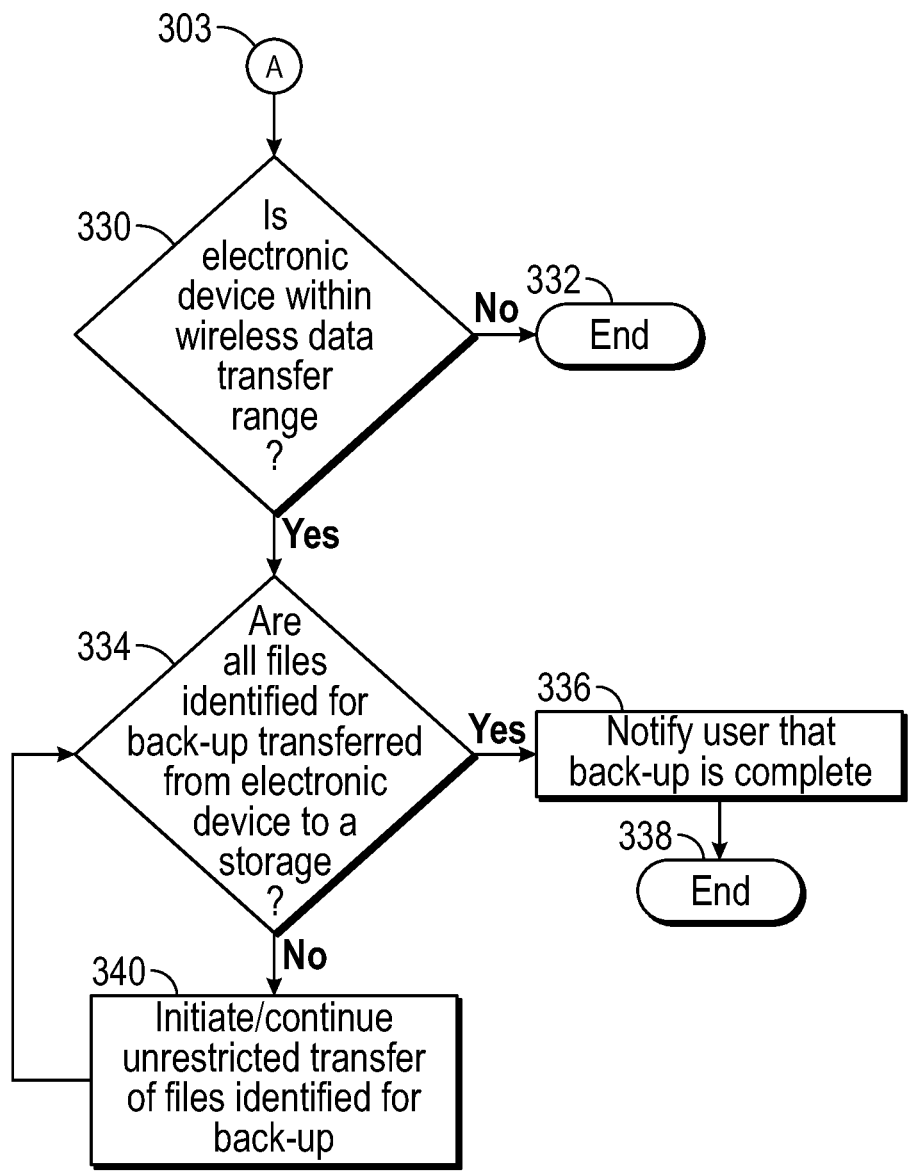
Figure 3C:
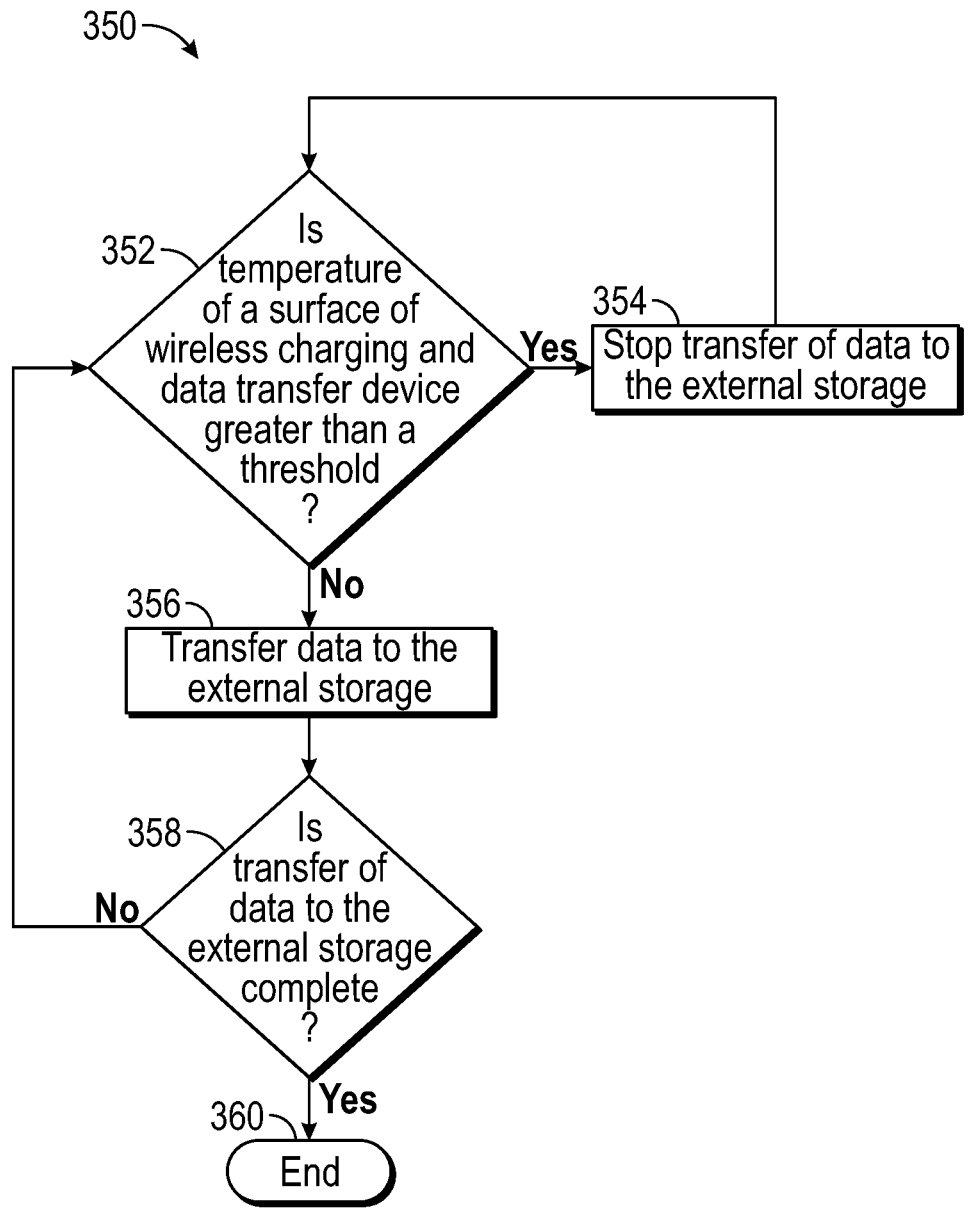

As illustrated in FIG. 3B, the method 300 can proceed to block 303 if, either in block 319 or in block 301, it is determined that the electronic device is not within the wireless charging range of the wireless charging and data transfer device. In block 303, the amount of charge of the power supply of the electronic device can be set to no value (or NULL). This can be performed, for example, because the charge of the power supply of the electronic device may not be obtained due to the electronic device being out of the wireless charging range. In block 303, the method 300 can deactivate or suspend operation of the wireless charging electronics 112. The method 300 can proceed to block 330, where it determines if the electronic device is within a wireless data transfer range. As described herein, the electronic device can be determined to be within a wireless data transfer range if the electronic signaling circuit (e.g., an integrated Bluetooth chipset) that is configured to intermittently or periodically emit an electronic signal (e.g., a Bluetooth low energy (BLE) beacon) can detect the electronic device. If, in block 330 it is determined that electronic device is not within the wireless data transfer range, then the process 300 can end, as shown in block 332. If, however, in block 330 it is determined that electronic device is within wireless data transfer range, then files identified for back-up that have not been transferred from the electronic device to the storage can be transferred without any restrictions on the size of the file, the type of the file, the number of files transferred and/or the amount of time during which files are transferred, as shown in block 340. If, in block 334, it is determined that all files identified for back-up have been transferred from the electronic device to a storage, then the user is notified that the back-up is complete, as shown in block 336 and the process 300 can end, as shown in block 338, FIG. 3C is a flowchart of an embodiment of a method 350 configured to transfer data from the storage of a wireless charging and data transfer device (e.g., device 100) to an external storage (e.g., a personal storage device or a cloud storage). The method can comprise determining if the temperature of a surface of the wireless charging and data transfer device which is in contact with an electronic device (e.g., electronic device) is greater than a threshold temperature, as shown in block 352. The threshold temperature can be greater than about 43° C. For example, the threshold temperature can be greater than about 50° C.-60° C. If, in block 352 it is determined that the temperature of the surface of the wireless charging and data transfer device 100 is below the threshold temperature, then data from the storage of the wireless charging and data transfer device can be transferred to the external storage, as shown in block 356. The transfer of data from the storage of the wireless charging and data transfer device to the external storage can continue until all the data from the storage of the wireless charging and data transfer device is transferred as shown in block 358 (and end, as shown in block 360) or until the temperature of the surface of the wireless charging and data transfer device 100 is above the threshold temperature. If the temperature of the surface of the wireless charging and data transfer device 100 is above the threshold temperature, then the transfer of data from the storage of the wireless charging and data transfer device to the external storage can be stopped (block 354) until the temperature of the surface of the wireless charging and data transfer device 100 falls below the threshold temperature.

The various operations and processes depicted in the flowcharts illustrated in FIGS. 3A-3C can be implemented by the controller 120. The controller 120 can comprise one or more electronic processors that are configured to execute instructions stored in a non-transitory medium to implement the various embodiments of the method to wirelessly charge and transfer data from an electronic device to a storage illustrated in FIGS. 3A-3C and/or otherwise described in this application.

The implementations of the wireless charging and data transfer device discussed in this application can provide simultaneous wireless charging of an electronic device and back-up of the contents of the electronic device in a time interval which is comparable to existing devices that provide charging functionality alone. The implementations of the wireless charging and data transfer device discussed in this application can use data analytics tools to gather information regarding the charging and back-up requirements of one or more users and use the information to provide optimal wireless charging and wireless data transfer performance. Various implementations of the wireless charging and data transfer device discussed in this application can be configured to statistically determine various information related to charging and back-up activity including but not limited to the battery temperature, the amount of files backed up by a user per day, amount of temperature rise as a result of transferring files to a personal storage or a cloud storage. Artificial intelligence based approaches can be employed to adjust various parameters associated with wireless charging and wireless data transfer based on the statistically determined information to improve wireless charging and wireless data transfer experience.

Various implementations of the wireless charging and data transfer device discussed in this application can be configured to connect to the thermostats of the heating/cooling systems in the house/office and adjust the temperature in the house/office to optimize wireless charging and wireless data transfer operation. Various implementations of the wireless charging and data transfer device discussed in this application can be configured to notify the user to move to a cooler area to optimize wireless charging and wireless data transfer operation.

Systems and Methods for Receiving Data from Multiple Devices

Use of mobile electronic devices such as smart phones, tablets, smart pads, handheld computing devices, etc. has become common to an extent that an individual may possess several mobile electronic devices. Accordingly, it is advantageous if the device 100 is capable of wirelessly backing-up data from a plurality of mobile electronic devices (such as, devices 150). Charging pads that are capable of charging a plurality of mobile electronic devices may comprise multiple charging coils that are configured to charge plurality of mobile electronic devices. Providing multiple charging coils to charge multiple devices can disadvantageously increase the size and cost of the charging pads. Such charging pads may not be configured to back-up files/contents (such as, photos, videos and/or documents) of the mobile electronic devices they are configured to charge.

Figure 4:
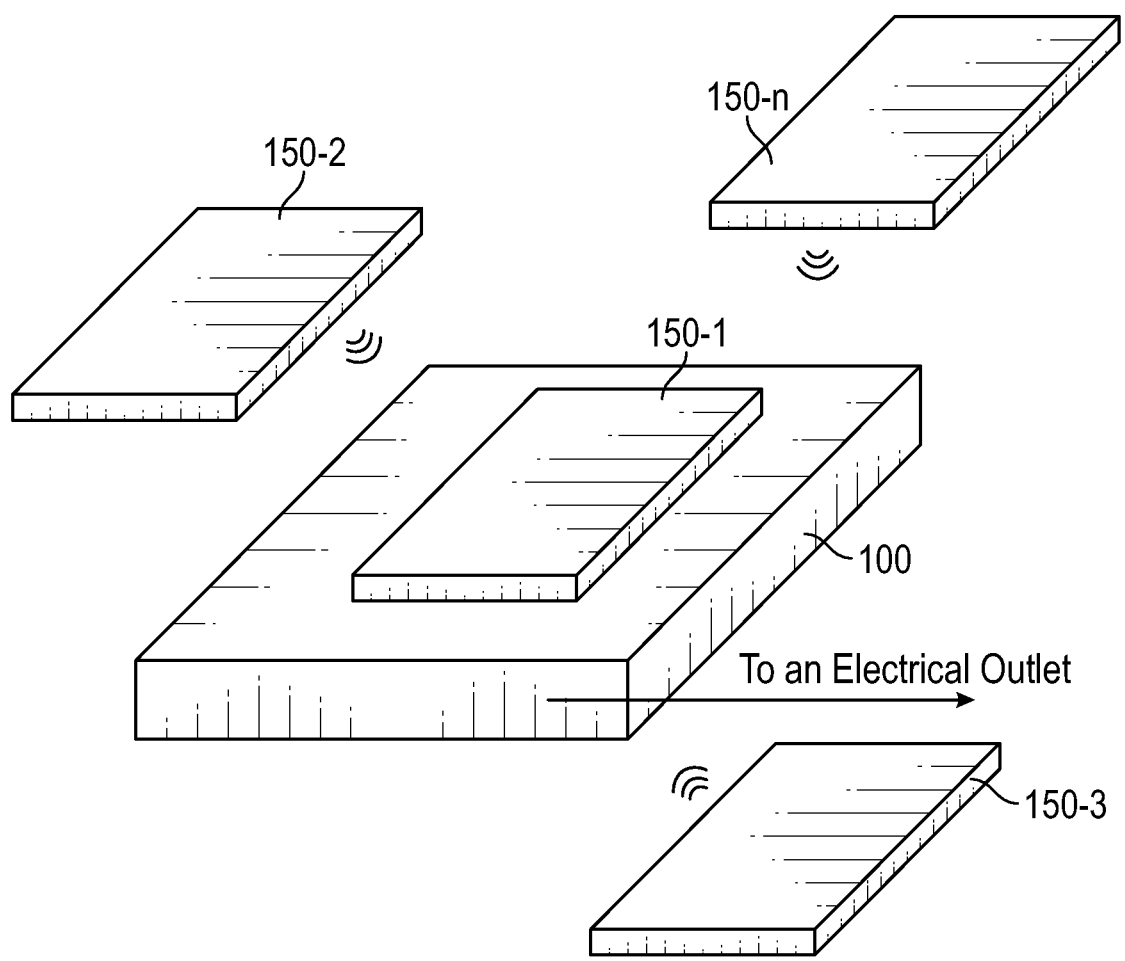
FIG. 4 illustrates a schematic view of a device for wireless transfer of data from a plurality of electronic devices.

The wireless charging and data transfer device 100 can be configured to not only wirelessly charge and back-up data from a mobile electronic device (such as, device 150) but also wirelessly back-up contents of a plurality of other mobile electronic devices in the vicinity of the device 100. Various implementations of the device 100 can be configured to (i) wirelessly charge and wirelessly back-up files/contents of a first mobile electronic device 150-1 (which can be referred to as a dominant master device); and (ii) wirelessly back-up files/contents of additional mobile electronic devices 150-2, 150-3, . . . , 150-n, as shown in FIG. 4.

The first mobile electronic device 150-1 can be similar to or identical to the device 150 discussed above. The device 100 can be configured to wirelessly charge and/or wirelessly transfer data from the first mobile electronic device 150-1 to the storage 114 and/or the external storage 124 as described herein. The wireless charging of and/or wireless transfer of data from the first mobile electronic device 150-1 to the storage 114 and/or the external storage 124 can be initiated when the first mobile electronic device 150-1 is placed on the surface of the device 100 or brought within a first predetermined distance from the device 100, as described herein. The first predetermined distance can be less than or equal to a distance over which the device 100 is capable of wirelessly charging the power supply of the first mobile electronic device 150-1.

The additional mobile electronic devices 150-2, 150-3, . . . , 150-n can be located within a second predetermined distance from the device 100. The second predetermined distance can be equal to the first predetermined distance in some implementations. In some other implementations, the second predetermined distance can be greater than the first predetermined distance. Various implementations of the device 100 can be additionally configured to wirelessly charge the additional mobile electronic devices 150-2, 150-3, . . . , 150-n. In various implementations, the second predetermined distance can be less than or equal to the distance over which the device 100 is capable of wirelessly transferring data from the first mobile electronic device 150-1.

Various implementations of the device 100 can be configured to automatically begin back-up of the additional mobile electronic devices 150-2, 150-3, . . . , 150-n when they are located within the second predetermined distance from the device 100. The wireless charging and/or wireless back-up of files/contents of the plurality of mobile electronic devices 150-1, 150-2, 150-3, . . . , 150-n can be performed without impacting the charging of the first mobile electronic device 150-1. Accordingly, as described herein, some implementations of the device 100 may be configured to reduce the rate of and/or interrupt wireless data transfer from the first mobile electronic device 150-1 and/or the additional mobile electronic devices 150-2, 150-3, . . . , 150-n in response to determining that (i) the charge of the power supply (for example, corresponding to the power supply 158) of the first mobile electronic device 150-1 is below a threshold level; and/or (ii) the temperature of the power supply of the first mobile electronic device 150-1 is above a threshold temperature. Various implementations of the device 100 may be configured to reduce the rate of and/or interrupt wireless data transfer from the additional mobile electronic devices 150-2, 150-3, . . . , 150-n in response to determining that (i) the charge of the power supply of one or more additional mobile electronic devices 150-2, 150-3, . . . , 150-n is below a threshold level; and/or (ii) the temperature of the power supply of one or more additional mobile electronic devices 150-2, 150-3, . . . , 150-n is above a threshold temperature. As discussed above, the device 100 can be configured to accomplish simultaneous wireless charging and wireless back-up of the contents the first mobile electronic device 150-1 in a time that is comparable to the time it takes for existing charging systems to charge the power supply of the first mobile electronic device 150-1 alone without transfer of data. For example, various implementations of the device 100 described herein are configured to simultaneously transfer data from the electronic device 150 to the storage 114 and/or the external storage 124 and fully charge the power supply 158 of the electronic device 150 in about 4-6 hours.

Various implementations of the device 100 configured to wirelessly back-up contents of one or more additional mobile electronic devices can comprise electronics (such as, a chipset) that is configured to simultaneously perform two functions. The first function cam include broadcasting one or more Bluetooth Low Energy (BLE) beacons over a BLE communication system. The second function can include accepting Bluetooth Classic (BT) commands from the dominant master device (which can be the first mobile electronic device 150-1) and the one or more additional masters 150-2, 150-3, . . . , 150-n. Although some embodiments are described as utilizing BLE and/or Classic Bluetooth, in some implementations, additional or alternative communications protocols can be used, such as Bluetooth 4.1, Bluetooth 4.2, Bluetooth 5, Bluetooth 5.1, Wi-Fi, Zigbee, Z-Wave, or the like.

Beacon Transmission

The one or more BLE beacons (or communications using another Bluetooth or wireless protocol as described herein) can be configured to broadcast data in an advertising mode to one or more devices (such as, mobile electronic devices 150-1, 150-2, 150-3, . . . , 150-n) that are in the vicinity and capable of receiving the data broadcast over the BLE communication system. The one or more devices can be configured to receive the one or more BLE beacons to trigger the automatic back-up (also referred to herein as wireless data transfer) to storage 114 of the device 100 and/or external storage 124. For example, automatic wireless charging of the first mobile electronic device 150-1 may be triggered by one or more BLE beacons broadcast by the device 100 when the first mobile electronic device 150-1 is placed on the device 100 and/or brought within a first predetermined distance of the device 100. Based on the charge status of the power supply of the first mobile electronic device 150-1 and/or temperature of the first mobile electronic device 150-1, automatic wireless back-up of the contents of the first mobile electronic device 150-1 can also be triggered by one or more BLE beacons broadcast by the device 100. This feature provides the user experience of "Back-up while you charge". Once the first mobile electronic device 150-1 is removed from the surface of the device 100 and/or not within the first predetermined distance from the device 100, such that wireless charging of the first mobile electronic device 150-1 is terminated, wireless back-up of the contents of the first mobile electronic device 150-1 can continue as long as the first mobile electronic device 150-1 is within wireless data transfer range (for example, within the Bluetooth and/or Wi-Fi range). For example, as discussed above, the device 100 can be configured to continue wireless back-up of large files, allow the user to browse files wirelessly, allow the user to wirelessly stream files and/or perform other functions after wireless charging of the first mobile electronic device 150-1 is terminated.

Communication with Multiple Devices

To wirelessly back-up of contents from the one or more additional mobile electronic devices 150-2, 150-3, . . . , 150-n and/or wirelessly charge the one or more additional mobile electronic devices 150-2, 150-3, . . . , 150-n, the device 100 can be configured to switch between different electronic devices of the one or more additional mobile electronic devices 150-2, 150-3, . . . , 150-n. To accomplish this, the device 100 can be configured to communicate with the one or more additional mobile electronic devices 150-2, 150-3, . . . , 150-n using Classic Bluetooth technology (or another Bluetooth or wireless protocol, as described herein). For example, multiple commands may be communicated from the device 100 to the one or more additional mobile electronic devices 150-2, 150-3, . . . , 150-n over classic Bluetooth technology to manage wireless back-up of contents from the one or more additional mobile electronic devices 150-2, 150-3, . . . , 150-n and/or wireless charging of the one or more additional mobile electronic devices 150-2, 150-3, . . . , 150-n.

Figure 5:
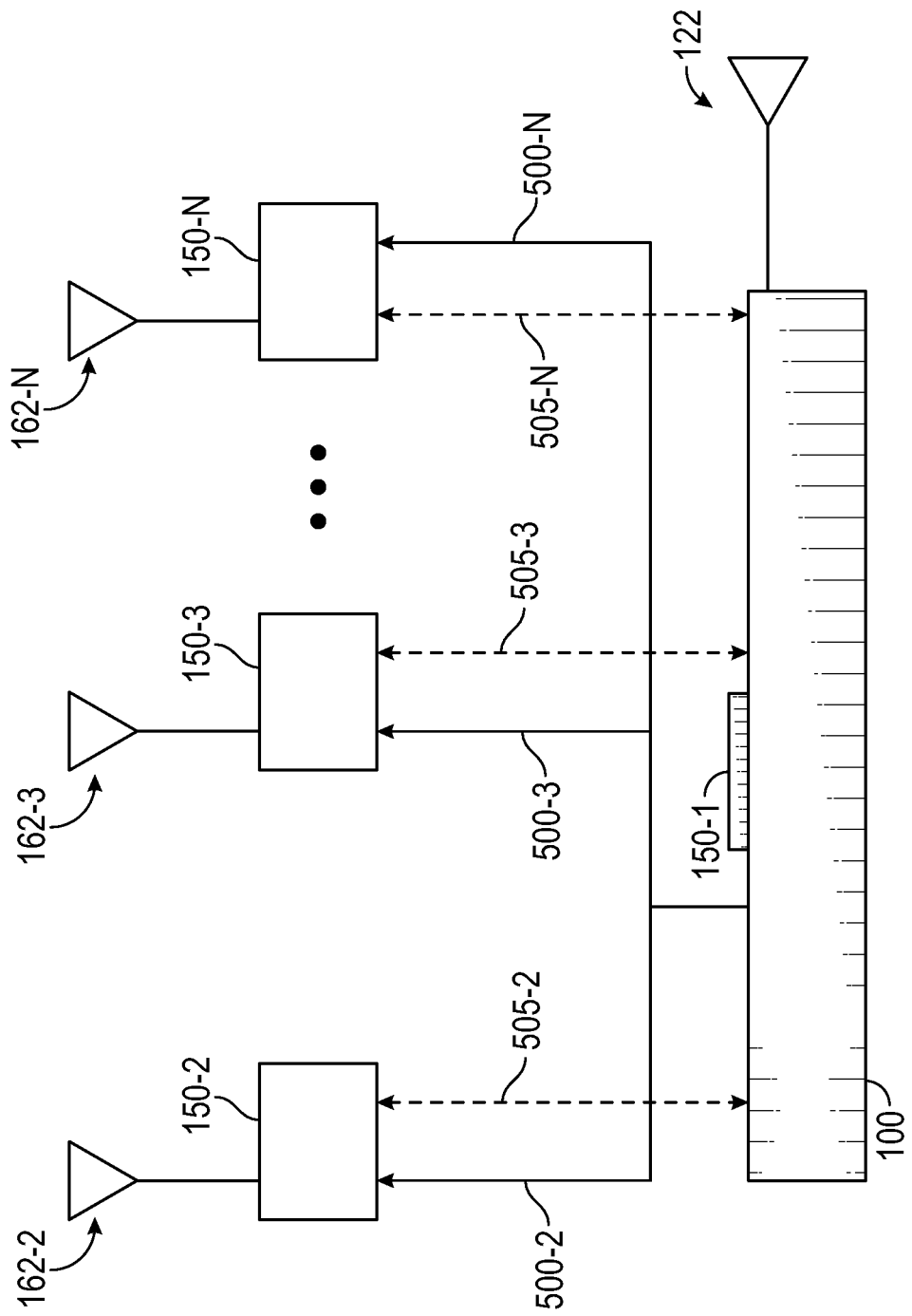
FIG. 5 schematically illustrates a wireless communication system to facilitate communication between a wireless charging and data transfer device and a plurality of electronic devices.

FIG. 5 illustrates a schematic block diagram of the wireless communication network between the device 100, the first electronic device 150-1 (shown as being positioned on the surface of the device 100) and the one or more additional mobile electronic devices 150-2, 150-3, . . . , 150-n. In FIG. 5, links 500-2, 500-3, . . . , 500-N depict the BLE communication links over which BLE beacons are broadcast. The one or more additional electronic devices can include wireless data transmitter/receiver electronics 162-2, 162-3, . . . , 162-N as described herein. Links 505-2, 505-3, . . . , 505-N depict the Classic Bluetooth communication network used by the one or more additional mobile electronic devices 150-2, 150-3, . . . , 150-n and the device 100 to manage wireless back-up of contents from the one or more additional mobile electronic devices 150-2, 150-3, . . . , 150-n and/or wireless charging of the one or more additional mobile electronic devices 150-2, 150-3, . . . , 150-n. Although not illustrated, the first electronic device 150-1 can similarly communicate with the device 100 over links 500 and 505 using the wireless data transmitter/receiver electronics 162.

Without any loss of generality, the first mobile electronic device 150-1, which can be placed on the device 100 or brought within a first predetermined distance of the device 100, may be the dominant master device. Wireless charging of the dominant master device can take precedence over wireless back-up of the contents of the dominant master device itself and/or wireless back-up of the contents of the one or more additional mobile electronic devices 150-2, 150-3, . . . , 150-n. The device 100 can be configured to operate in one of two modes—a Single Master Mode and a Dominant Master Mode to ensure that the wireless charging of the dominant master device takes precedence over wireless back-up of the contents of the dominant master device itself and/or wireless back-up of the contents of the one or more additional mobile electronic devices 150-2, 150-3, . . . , 150-n.

Single Master Mode

In the single master mode, the device 100 can be configured to manage wireless back-up of the contents of the dominant master device as well as the one or more additional mobile electronic devices 150-2, 150-3, . . . , 150-n without impacting the time required to wireless charging of the dominant master device. Accordingly, the device 100 may be configured to wirelessly transfer data from the dominant master device as well as the one or more additional mobile electronic devices 150-2, 150-3, . . . , 150-n using the FDCM or the FTM approach described herein. For example, the device 100 may be configured to intermittently stop or inhibit wireless transfer of data from the dominant master device as well as the one or more additional mobile electronic devices 150-2, 150-3, . . . , 150-n once a certain amount of data has been transferred (such as, FDCM) or after data has been transferred wirelessly for a certain amount of time (such as, FTM) if the charge of the power supply of the dominant master is greater than a low charge threshold (for example, greater than about 20%) and less than a high charge threshold (for example, less than about 95%), as described above.

The device 100 may also be configured to turn off wireless back-up of the contents of the dominant master device as well as the one or more additional mobile electronic devices 150-2, 150-3, . . . , 150-n if, as described above, (a) the amount of charge of the power supply of the dominant master is at or below a low charge threshold and/or (b) a temperature of the of the power supply of the dominant master device is above a threshold temperature (such as, greater than about 43° C.) as discussed above.

Accordingly, when operating in the single master mode, the device 100 can be configured to control the rate at which contents of the dominant master device as well as the one or more additional mobile electronic devices 150-2, 150-3, . . . , 150-n are backed-up based on the charging state and/or temperature of the power supply of the dominant master device. When operating in the single master mode, the device 100 can be configured to stop the wireless back-up of the dominant master device as well as the one or more additional mobile electronic devices 150-2, 150-3, . . . , 150-n without requiring confirmation or consent from the user of the dominant master device and/or any of the one or more additional mobile electronic devices 150-2, 150-3, . . . , 150-n. Any of the features described in this section can be implemented by the controller 120.

Multiple Master Mode

When operating in the multiple master mode, the device 100 can be configured to manage the wireless charging of the dominant master device without impacting the wireless back-up of the one or more additional mobile electronic devices 150-2, 150-3, . . . , 150-n. For example, consider the first mobile electronic device 150-1 that is placed on the device 100 or is within a first predetermined distance of the device 100 and is designated as the dominant master device. Upon removing the dominant master device from the surface of the device 100 or to a distance greater than the first predetermined distance, wireless charging of the dominant master can be stopped while wireless back-up of the contents of the device 150-1 can continue.

Now consider that another electronic device, such as any of the additional mobile electronic devices 150-2, 150-3, ..., 150-*n*, is placed on the device 100 or is brought within a first predetermined distance of the device 100. The electronic device 150-1 is no longer the dominant master device (and can be referred to as the previous dominant master device). Instead, the another mobile electronic device will be designated as the new dominant master device. In the event that the charge of the power supply of the new dominant master device is below or at a low threshold value and/or the temperature of the power supply of the new dominant master is above a threshold temperature, the device 100 operating in the single master mode may interrupt the wireless back-up of the contents of the electronic device 150-1 to charge that the power supply of the new dominant master device. However, this may impact the wireless data transfer experience for the user of the device 150-1. For example, the user may be going through the contents of the device 150-1 (such as, browsing the photo gallery) or checking the status of the back-up of the device 150-1 when the wireless back-up may be interrupted without any warning in the single master mode.

To improve the wireless transfer experience, the device 100 operating in the multiple master mode can be configured communicate with the previous dominant master device (device 150-1) to determine whether wireless back-up is active. For example, a determination can be made whether a software application that manages the wireless back-up of the contents of the previous dominant master device is in active use or is in the foreground. The communication between the device 100 and the previous dominant master device can occur using Classic Bluetooth technology (or another Bluetooth or wireless protocol, as described herein). The previous dominant master can operate in as a master device. In response to determining that the wireless back-up of the contents of the previous dominant master device is active, the device 100 can continue wireless back-up of the contents of the previous dominant master device for an extra amount of time even if the power supply of the new dominant master device is below or at the low charge threshold and/or the temperature of the power supply of the new dominant master is below a threshold temperature. The extra amount of time can be selected to be sufficiently small so as not to impact charging time of the new dominant master device. For example, the extra amount of time for which the device 100 continues wireless back-up of the contents of the previous dominant master may be less than or equal to about 1 minute, 2 minutes, 3 minutes, 3 minutes, or the like in various implementations. If wireless back-up remains in active after the extra amount of time has elapsed, the device 100 can be configured to send a notification to the user of the previous dominant master device indicating that the charge level of the power supply of the new dominant master device is low and thus wireless back-up of the contents of the previous dominant master device will be interrupted. The notification can also provide selections OK and/or IGNORE (for example, in form of soft keys displayed on the screen) allowing the user of the previous dominant master device to (i) suspend wireless back-up of the contents of the previous dominant master device or (ii) ignore the request from the device 100 and continue wireless back-up of the contents of the previous dominant master device. Accordingly, the user of the previous dominant master device can choose a preferred action. The notification by the device 100 to the previous dominant master device can be provided using Classic Bluetooth technology (or another Bluetooth or wireless protocol, as described herein).

If in response to the selections, the user of the previous dominant master device selects OK (for example, by pressing the OK soft key), then the device 100 can be configured to suspend wireless back-up of the contents of the previous dominant master device and give priority to wireless charging of the power supply of the new dominant master device. Suspension of the wireless back-up of the contents of the previous dominant master device can be achieved by turning-off the electronics (for example, Wi-Fi chipset) that is configured to perform the wireless back-up of the contents of the previous dominant master device.

If in response to the selections, the user of the previous dominant master selects IGNORE (for example, by pressing the IGNORE soft key), then the device 100 can be configured to continue wireless back-up of the contents of the previous dominant master device for an additional amount of time (such as, less than or equal to about 1 minute, 2 minutes, 3 minutes, 4 minutes, or the like). If the wireless back-up of the contents of the previous dominant master device remains active after the additional amount of time has elapsed, the device 100 can be configured to send another notification to the user of the previous dominant master device providing information regarding the charge level of the power supply of the new dominant master device. The notification can also indicate that wireless back-up of the contents of the previous dominant master device will be suspended and will resume after the power supply of the new dominant master device attains sufficient charge. The notification by the device 100 to the previous dominant master can be provided using Classic Bluetooth technology (or another Bluetooth or wireless protocol, as described herein).

Once the power supply of the new dominant master device is sufficiently charged (for example, to a level greater than the high charge level), the device 100 can be configured to resume wireless back-up of the contents of the previous dominant master device. The device 100 can provide a notification to the user of the previous dominant master device that wireless back-up of the contents of the previous dominant master device has resumed. This notification can be provided using Classic Bluetooth technology (or another Bluetooth or wireless protocol, as described herein).

Accordingly, the multiple master mode can allow the user of the previous dominant master device to choose which device has the priority according to the user's needs and requirements. The multiple master mode can be extended to facilitate wireless back-up of the contents of additional mobile electronic devices on multiple wireless charging and wireless data transfer devices.

For example, consider there are two wireless charging and wireless data transfer devices 100*a* and 100*b* in a residential location or an office space. The two wireless charging and wireless data transfer devices 100*a* and 100*b* may be interconnected over a wired or a wireless network. In this example, assume that the new dominant master device is in the wireless charging range of the wireless charging and wireless data transfer device 100*a* and there is no mobile electronic device in the wireless charging range of the wireless charging and wireless data transfer device 100*b*. Under these circumstances, the device 100*a* may be configured to provide notification to the user of the previous dominant master device that the mobile device in the wireless charging range of the device 100*a* needs to be charged. However, there is no mobile electronic device in the wireless charging range of the device 100*b*. The device 100*b* can be configured to prompt the user to indicate preference to wirelessly back-up data of the previous dominant master device to the device 100*b*. If the user accepts to wirelessly back-up contents of the previous dominant master device to the second device 100*b*, then device 100*a* can be configured to facilitate back-up of the contents of the previous dominant master device to the second device 100b and wirelessly charge the new dominant master. The contents of the previous dominant master device transferred to the device 100a and device 100b can be transferred to the external storage 124.

In this manner, the multiple master mode can be configured to provide an approach for interconnected wireless charging and wireless data transfer devices that can be tailored based on user behavior. The device 100, 100a, or 100b can be configured to identify the multiple mobile electronic devices based on their universally unique identifier (UUID) and track the commands received from the different mobile electronic devices over Classic Bluetooth (or another Bluetooth or wireless protocol, as described herein) using the UUID of the respective devices. Any of the features described in this section can be implemented by the controller 120 of one or more devices 100, 100a, or 100b.

OTHER VARIATIONS

Those skilled in the art will appreciate that in some embodiments, additional or alternative modules can be used to perform functionalities described herein. The actual steps taken in the disclosed processes may differ from those shown in the figures. Additional system components can be utilized, and disclosed system components can be combined or omitted. Depending on the embodiment, certain of the steps described above may be removed, others may be added.

While certain embodiments have been described, these embodiments have been presented by way of example only, and are not intended to limit the scope of the protection. Indeed, the novel methods and systems described herein may be embodied in a variety of other forms. Furthermore, various omissions, substitutions and changes in the form of the methods and systems described herein may be made without departing from the spirit of the protection. The accompanying claims and their equivalents are intended to cover such forms or modifications as would fall within the scope and spirit of the protection. For example, the systems and methods disclosed herein can be applied to flash memory as included in any number of devices, such as removable flash cards, embedded memory, solid-state drives (SSDs), hybrid hard drives, and the like. Moreover, while embodiments are described herein as implemented by a controller of a flash memory device, these functionalities may additionally or alternatively be implemented on systems external to a flash memory device. Illustratively, the machine learning algorithms may be implemented on a network-connected system external to a flash memory device, which operates to collect information from any number of devices and to determine correlations between characteristics of memory cells and offsets to operating parameters of such cells. Such system may then transmit learned correlation information or determined offsets to a flash memory device for use by a controller in the manner described above.

The various components illustrated in the figures may be implemented as software and/or firmware on a processor, application-specific integrated circuit (ASIC), field-programmable gate array (FPGA), or dedicated hardware. Hardware components, such as processors, ASICs, FPGAs, and the like, can have logic circuitry. Also, the features and attributes of the specific embodiments disclosed above may be combined in different ways to form additional embodiments, all of which fall within the scope of the present disclosure. Although the present disclosure provides certain embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

Various disclosed embodiments are applicable to various types of non-volatile solid-state memory which may comprise one or more of various types of memory devices such as flash integrated circuits, Chalcogenide random access memory (C-RAM), Phase Change Memory (PC-RAM or PRAM), Programmable Metallization Cell RAM (PMC-RAM or PMC), Ovonic Unified Memory (OUM), Resistive RAM (RRAM), NAND memory (for example, single-level cell (SLC) memory, multi-level cell (MLC) memory, or any combination thereof), NOR memory, electrically erasable programmable read-only memory (EEPROM), Ferroelectric Memory (FeRAM), Magnetoresistive RAM (MRAM), other discrete Non-Volatile Memory (NVM) chips, or any combination thereof.

What is claimed is:

1. A system for wirelessly charging an electronic device and wirelessly receiving data from a plurality of electronic devices, the system comprising:
    a housing with a surface configured to support a first electronic device;
    charging circuitry enclosed by the housing, the charging circuitry configured to wirelessly charge a power supply of the first electronic device;
    a data receiver configured to wirelessly receive data from the first electronic device and from a second electronic device; and
    a controller comprising one or more electronic processors configured to:
        in response to detecting presence of the first electronic device proximal to the surface of the housing:
            obtain information regarding a charging state of the power supply;
            determine an amount of a charging power to deliver to the power supply based on the obtained information regarding the charging state of the power supply; and
            control the charging circuitry to wirelessly deliver the determined amount of charging power to the power supply;
        control the data receiver to receive data wirelessly from at least one of the first electronic device or the second electronic device selectively based on the obtained information regarding the charging state of the power supply; and
        in response to a determination that the obtained information regarding the charging state of the power supply of the first electronic device indicates that the charging state of the power supply of the first electronic device does not satisfy a first threshold, provide a notification to the second electronic device that wireless transfer of data from the second electronic device will be suspended.

2. The system of claim 1, wherein the one or more electronic processors are further configured to:
    obtain information regarding a temperature of the power supply.

3. The system of claim 2, wherein the one or more electronic processors are further configured to:
determine the amount of the charging power to deliver to the power supply further based on the obtained information regarding the temperature of the power supply.

4. The system of claim 2, wherein the one or more electronic processors are further configured to:
control the data receiver to receive data from at least one of the first or second electronic devices based on the obtained information regarding the temperature of the power supply.

5. The system of claim 1, wherein the one or more electronic processors are further configured to:
turn off the data receiver in response to a determination that the obtained information regarding the charging state of the power supply indicates that the charging state of the power supply does not satisfy the first threshold.

6. The system of claim 2, wherein the one or more electronic processors are further configured to turn off the data receiver in response to a determination that the information regarding the temperature of the power supply indicates that the temperature of the power supply satisfies a threshold temperature.

7. The system of claim 1, wherein the one or more electronic processors are further configured to:
control the data receiver to continuously receive data wirelessly from the second electronic device in response to a determination that the obtained information regarding the charging state of the power supply of the first electronic device indicates that the charging state of the power supply of the first electronic device satisfies a second threshold.

8. The system of claim 1, wherein the one or more electronic processors are further configured to:
turn off the data receiver in response to receiving a user input indicative of suspending wireless transfer of data from the second electronic device.

9. The system of claim 1, wherein the one or more electronic processors are further configured to:
continuously receive data wirelessly from the second electronic device for an additional amount of time in response to receiving a user input indicative of not suspending wireless transfer of data from the second electronic device.

10. The system of claim 9, wherein the one or more electronic processors are further configured to:
provide another notification to the second electronic device that wireless transfer of data from the second electronic device will be suspended after the additional amount of time has elapsed.

11. The system of claim 10, wherein the one or more electronic processors are further configured to:
turn off the data receiver in response to the additional amount of time having elapsed.

12. The system of claim 9, wherein the additional amount of time is less than or equal to about 2 minutes.

13. The system of claim 9, wherein:
the one or more electronic processors are further configured to communicate with the first electronic device and with the second electronic device over a Bluetooth connection.

14. The system of claim 13, wherein the first electronic device is configured as a dominant master device.

15. The system of claim 14, wherein the second electronic device is configured as a master device.

16. A system for wirelessly charging an electronic device and wirelessly receiving data from a plurality of electronic devices, the system comprising:
means for housing, the housing means comprising a surface configured to support a first electronic device;
means for wirelessly charging a power supply of the first electronic device, the wireless charging means enclosed within the housing means;
means for wirelessly receiving data from the first electronic device and from a second electronic device, the wireless data receiving means enclosed within the housing means; and
means for controlling configured to:
in response to detecting presence of the first electronic device in a wireless charging range of the wireless charging means, control the wireless charging means to wirelessly deliver a charging power to charge the power supply;
control the wireless data receiving means to receive data wirelessly from at least one of the first electronic device or the second electronic device selectively based on a charging state of the power supply; and
provide a notification to the second electronic device that wireless transfer of data from the second electronic device will be suspended in response to a determination that obtained information regarding the charging state of the power supply of the first electronic device indicates that the charging state of the power supply of the first electronic device does not satisfy a first threshold.

17. A method for wirelessly charging an electronic device and wirelessly receiving data from a plurality of electronic devices, the method comprising:
in response to detecting presence of a first electronic device in a wireless charging range:
obtaining information regarding a charging state of a power supply of the first electronic device;
determining an amount of a charging power to deliver to the power supply based on the obtained information regarding the charging state of the power supply; and
controlling the charging circuitry to wirelessly deliver the determined amount of charging power to the power supply;
wirelessly receiving data from at least one of the first electronic device or a second electronic device selectively based on the obtained information regarding the charging state of the power supply; and
in response to a determination that the obtained information regarding the charging; state of the power supply of the first electronic device indicates that the charging state of the power supply of the first electronic device does not satisfy a first threshold, providing a notification to the second electronic device that wireless transfer of data from the second electronic device will be suspended.

18. The method of claim 17, further comprising:
inhibiting wireless reception of data from the second electronic device in response to receiving a user input indicative of suspending wireless transfer of data from the second electronic device.

19. The method of claim 17, further comprising:
continuously receiving data from the second electronic device for an additional amount of time in response to receiving a user input indicative of continuing wireless transfer of data from the second electronic device.

\* \* \* \* \*